(12) United States Patent
Kita et al.

(10) Patent No.: US 12,170,594 B2
(45) Date of Patent: Dec. 17, 2024

(54) ACTION EXECUTION SYSTEM AND CONTROL METHOD THEREOF

(71) Applicant: RAKUTEN MOBILE, INC., Tokyo (JP)

(72) Inventors: Shinya Kita, Tokyo (JP); Jithin Chathankandath, Tokyo (JP); Mohit Luthra, Singapore (SG); Bharath Rathinam, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/044,991

(22) PCT Filed: Oct. 5, 2021

(86) PCT No.: PCT/JP2021/036883
§ 371 (c)(1),
(2) Date: Mar. 13, 2023

(87) PCT Pub. No.: WO2023/058133
PCT Pub. Date: Apr. 13, 2023

(65) Prior Publication Data
US 2024/0305531 A1   Sep. 12, 2024

(51) Int. Cl.
G06F 15/173     (2006.01)
H04L 41/0895    (2022.01)

(52) U.S. Cl.
CPC .................. H04L 41/0895 (2022.05)

(58) Field of Classification Search
CPC .................................... H04L 41/0895
USPC ........................................ 709/224
See application file for complete search history.

(56) References Cited

U.S. PATENT DOCUMENTS

| 11,012,311 B2 * | 5/2021 | Giust ................. H04L 41/0893 |
| 11,296,957 B2 * | 4/2022 | Xu ...................... H04L 41/5051 |
| 2016/0105330 A1 | 4/2016 | Choudhary et al. |
| 2019/0379577 A1 | 12/2019 | Tiwari et al. |
| 2020/0013107 A1 | 1/2020 | Kusano |

(Continued)

FOREIGN PATENT DOCUMENTS

| JP | 2017-184168 A | 10/2017 |
| WO | 2018/034321 A1 | 2/2018 |
| WO | 2018/181826 A1 | 10/2018 |

OTHER PUBLICATIONS

International Search Report in PCT Application No. PCT/JP2021/036887, mailed Jan. 11, 2022, 3pp.

*Primary Examiner* — Alicia Baturay
(74) *Attorney, Agent, or Firm* — HAUPTMAN HAM, LLP

(57) ABSTRACT

An E2EO module stores action data which is linked to a condition relating to a combination of an operation status of a specific type of element and an operation status of another type of element linked to the specific type of element, and which indicates an action to be executed on the specific type of element that satisfies the condition. The E2EO module identifies, based on the current status indicated by the inventory data, a combination of a current operation status of the specific type of element included in the communication system and a current operation status of another type of element linked to the specific type of element. The E2EO module executes, when the identified combination satisfies the condition linked to the action data, the action indicated by the action data on the specific type of element.

8 Claims, 29 Drawing Sheets

(56) References Cited

U.S. PATENT DOCUMENTS

2021/0360741 A1 11/2021 Shimojou et al.
2022/0353138 A1* 11/2022 Wyszkowski ....... H04L 41/5045
2023/0057210 A1* 2/2023 Kita ................... H04L 41/5054

* cited by examiner

FIG.9

| PRODUCT CATALOG DATA |
| --- |
| SERVICE CATALOG DATA |
| INVENTORY TEMPLATE DATA |
| CM TEMPLATE DATA |
| MONITORING SCRIPT DATA |
| SECURITY SCRIPT DATA |
| HELM CHART DATA |
| CONTAINER IMAGE DATA |

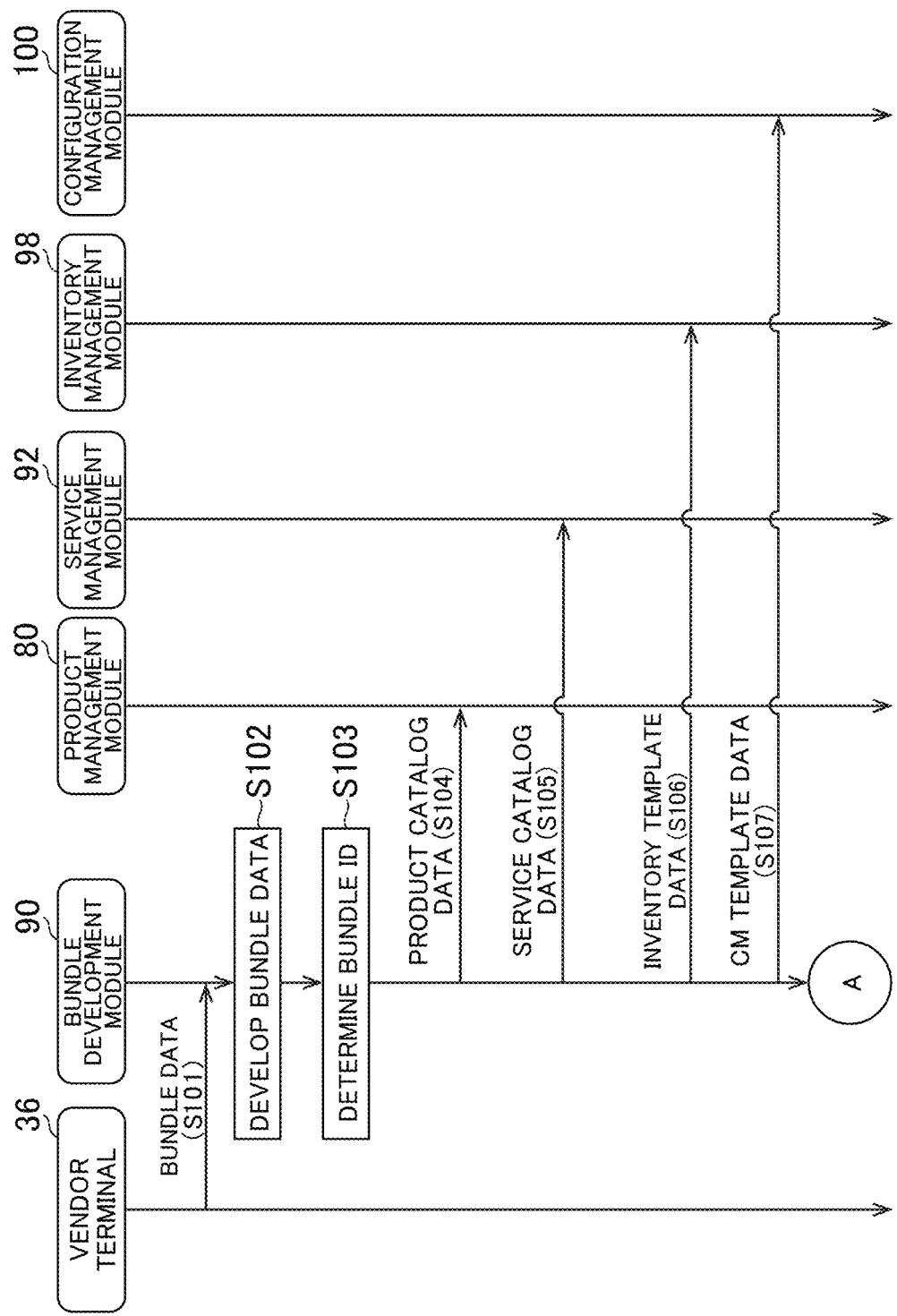

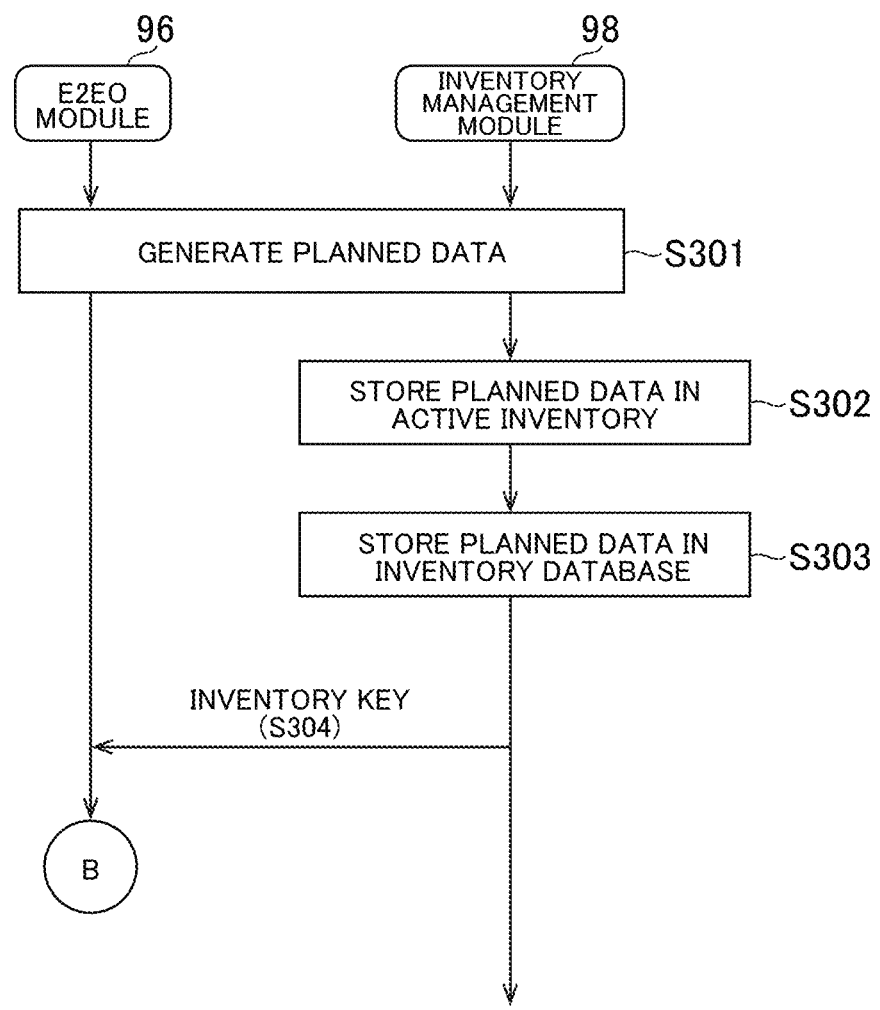

ACTION EXECUTION SYSTEM AND CONTROL METHOD THEREOF

RELATED APPLICATIONS

The present application is a National Phase of International Application Number PCT/JP2021/036883, filed Oct. 5, 2021.

TECHNICAL FIELD

The present invention relates to an action execution system and a control method thereof.

BACKGROUND ART

As an example of a technology relating to construction of elements included in a communication system, such as a functional unit group, in accordance with purchase of a network service, in Patent Literature 1, there is described a technology for deconstructing an order of a product purchased by a customer into virtualized network function (VNF) units and deploying the VNF units on a network functions virtualization infrastructure (NFVI). In addition, in Patent Literature 1, it is described that an NEV orchestrator performs actions including healing and scaling on VNFs.

CITATION LIST

Patent Literature

[Patent Literature 1] WO 2018/181826 A1

SUMMARY OF INVENTION

Technical Problem

With the technology as described in Patent Literature 1, in regard to each individual VNE included in a communication system, an action corresponding to an operation status of the VNF is locally performed on the VNF, and hence it is not possible to execute an action based on an overall operation status of the communication system.

The present invention has been made in view of the above-mentioned circumstances, and has an object to provide an action execution system and a control method thereof which are capable of executing an action corresponding to an overall operation status of a communication system.

Solution to Problem

In order to solve the above-mentioned problem, according to one embodiment of the present invention, there is provided an action execution system including: inventory data storage means for storing inventory data indicating a current status of a link between elements included in a communication system; action data storage means for storing action data which is linked to a condition relating to a combination of an operation status of a specific type of element and an operation status of another type of element linked to the specific type of element, and which indicates an action to be executed on the specific type of element that satisfies the condition; operation status identification means for identifying, based on the current status indicated by the inventory data, a combination of a current operation status of the specific type of element included in the communication system and a current operation status of another type of element linked to the specific type of element; and action execution means for executing, when the identified combination satisfies the condition linked to the action data, the action indicated by the action data on the specific type of element.

In one aspect of the present invention, the action data storage means is configured to store the action data which is linked to a condition relating to a combination of an operation status of a specific type of network service and an operation status of each of a plurality of functional units under control of the specific type of network service, and which indicates an action to be executed on the specific type of network service that satisfies the condition, the operation status identification means is configured to identify, based on the current status indicated by the inventory data, a combination of a current operation status of the specific type of network service included in the communication system and a current operation status of each of the plurality of functional units under the control of the specific type of network service, and the action execution means is configured to execute, when the identified combination satisfies the condition linked to the action data, the action indicated by the action data on the specific type of network service.

As another example, the action data storage means is configured to store the action data which is linked to a condition relating to a combination of an operation status of a specific type of functional unit and an operation status of a network service having the specific type of functional unit under control thereof, and which indicates an action to be executed on the specific type of functional unit that satisfies the condition, the operation status identification means is configured to identify, based on the current status indicated by the inventory data, a combination of a current operation status of the specific type of functional unit included in the communication system and a current operation status of the network service having the specific type of functional unit under the control thereof, and the action execution means is configured to execute, when the identified combination satisfies the condition linked to the action data, the action indicated by the action data on the specific type of functional unit.

As still another example, the action data storage means is configured to store the action data which is linked to a condition relating to a combination of an operation status of a specific type of network slice and an operation status of each of a plurality of functional units belonging to the specific type of network slice, and which indicates an action to be executed on the specific type of network slice that satisfies the condition, the operation status identification means is configured to identify, based on the current status indicated by the inventory data, a combination of a current operation status of the specific type of network slice included in the communication system and a current operation status of each of the plurality of functional units belonging to the specific type of network slice, and the action execution means is configured to execute, when the identified combination satisfies the condition linked to the action data, the action indicated by the action data on the specific type of network slice.

As yet another example, the action data storage means is configured to store the action data which is linked to a condition relating to a combination of an operation status of a specific type of functional unit and an operation status of a network slice to which the specific type of functional unit belongs, and which indicates an action to be executed on the specific type of functional unit that satisfies the condition, the operation status identification means is configured to identify, based on the current status indicated by the inventory data, a combination of a current operation status of the specific type of functional unit included in the communication system and a current operation status of the network slice to which the specific type of functional unit belongs, and the action execution means is configured to execute, when the identified combination satisfies the condition linked to the action data, the action indicated by the action data on the specific type of functional unit.

Further, in one aspect of the present invention, the condition is a condition relating to a combination of a performance index value of the specific type of element or an event that occurs in the specific type of element and a performance index value of another type of element linked to the specific type of element or an event that occurs in the another type of element.

Further, in one aspect of the present invention, each of the elements is a network service, a functional unit, a CNFC, a pod, a container, a network slice (NSI), or a network slice subnet instance (NSSI).

Further, according to one embodiment of the present invention, there is provided a control method for an action execution system, the action execution system including: inventory data storage means for storing inventory data indicating a current status of a link between elements included in a communication system; and action data storage means for storing action data which is linked to a condition relating to a combination of an operation status of a specific type of element and an operation status of another type of element linked to the specific type of element, and which indicates an action to be executed on the specific type of element that satisfies the condition, the control method including the steps of: identifying, based on the current status indicated by the inventory data, a combination of a current operation status of the specific type of element included in the communication system and a current operation status of another type of element linked to the specific type of element; and executing, when the identified combination satisfies the condition linked to the action data, the action indicated by the action data on the specific type of element.

BRIEF DESCRIPTION OF DRAWINGS

FIG. 9 is a diagram for illustrating an example of data structure of a data group generated based on the bundle file.

FIG. 18A is a flow chart for illustrating an example of a flow of processes performed by a vendor terminal, the MPS, and the NOS in the one embodiment of the present invention.

FIG. 20A is a flow chart for illustrating an example of a flow of processes performed by the NOS in the one embodiment of the present invention.

DESCRIPTION OF EMBODIMENTS

[Overall Configuration]

One embodiment of the present invention is now described in detail with reference to the drawings.

Figure 1:
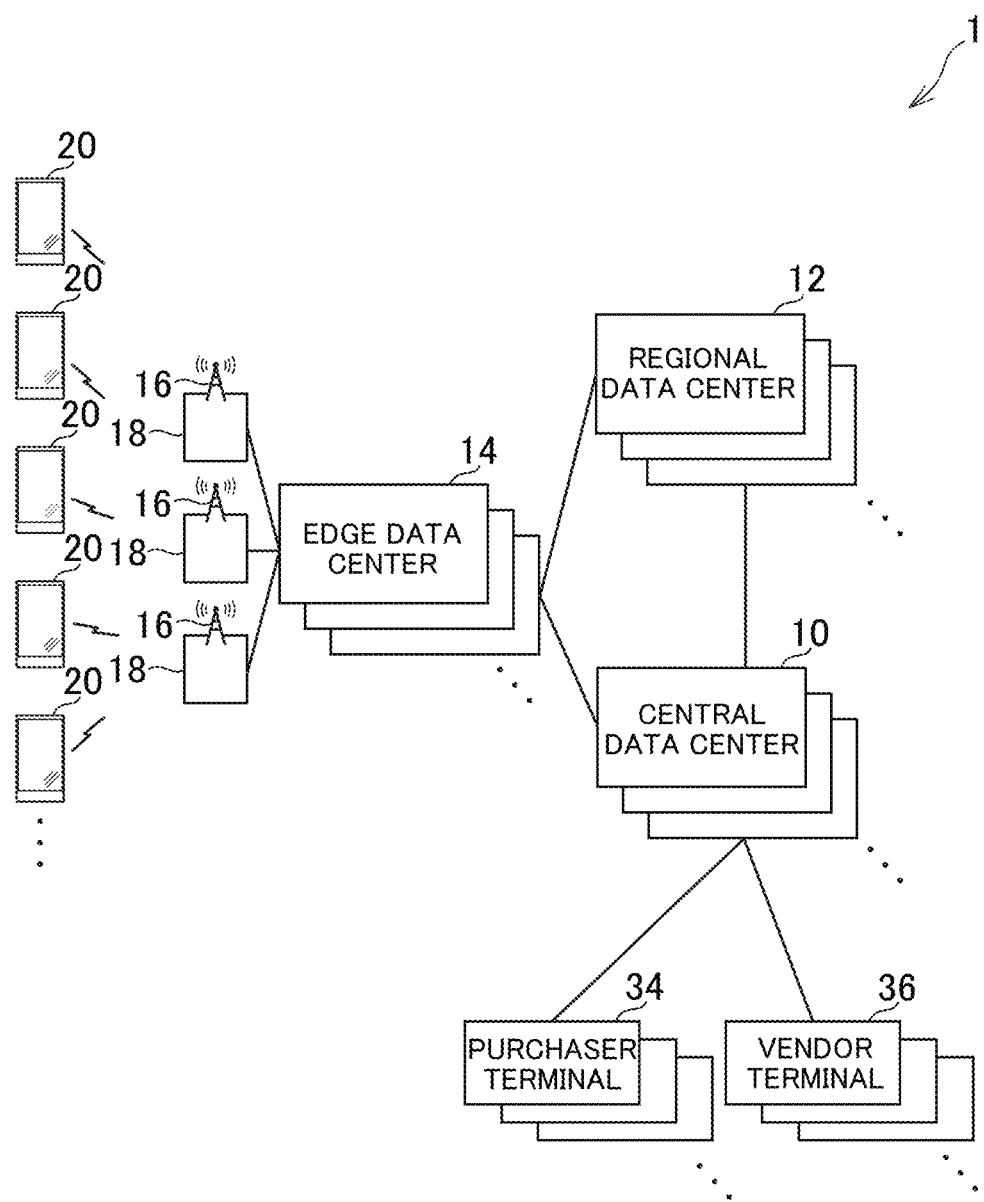
FIG. 1 is a diagram for illustrating an example of a communication system in one embodiment of the present invention.
Figure 2:
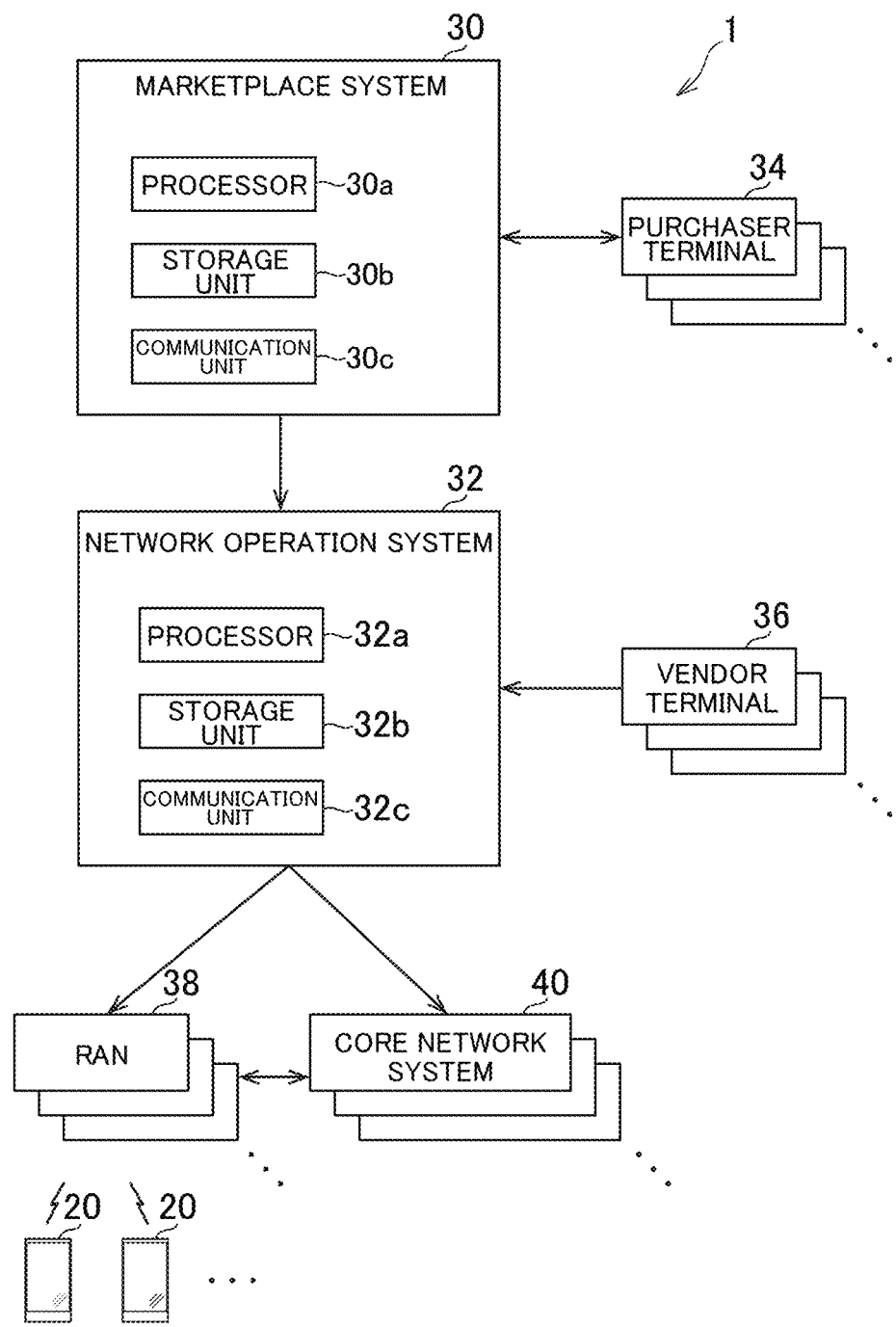
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central 10 data centers are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to/from a communication facility 18 provided with an antenna 16. In this case, as illustrated in FIG. 1, one edge data center 14 may be capable of communicating to/from several communication facilities 18. The communication facility 18 may include a computer, for example, a server computer. The communication facility 18 in this embodiment performs radio communication to/from a user equipment (UE) 20 via the antenna 16.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to/from one another. Communication can also be performed between the central data centers 10, between the regional data centers 12, and between the edge data centers 14.

As illustrated in FIG. 2, the communication system 1 in this embodiment includes a marketplace system (MPS) 30, a network operation system (NOS) 32, a plurality of purchaser terminals 34, a plurality of vendor terminals 36, a plurality of radio access networks (RANs) 38, a plurality of core network systems 40, and a plurality of UEs 20. The purchaser terminal 34 and the vendor terminal 36 are also illustrated in FIG. 1. The core network system 40, the RAN 38, and the UE 20 cooperate with each other to implement a mobile communication network.

The RAN 38 is a computer system, which is provided with the antenna 16, and corresponds to an eNodeB (eNB) in 4G and an NR base station (gNB) in 5G. The RANs 38 in this embodiment are implemented mainly by server groups arranged in the edge data centers 14 and the communication facilities 18. A part of the RAN 38 (for example, virtual distributed unit (vDU) or virtual central unit (vCU) in 4G or distributed unit (DU) or central unit (CU) in 5G) may be implemented by the central data center 10 or the regional data center 12 instead of the edge data center 14.

The core network system 40 is a system corresponding to an evolved packet core (EPC) in a fourth generation mobile communication system (hereinafter referred to as "4G") or a 5G core (5GC) in a fifth generation mobile communication system (hereinafter referred to as "5G"). The core network systems 40 in this embodiment are implemented mainly by server groups arranged in the central data centers 10 or the regional data centers 12.

The MPS 30 in this embodiment is configured, for example, on a cloud platform and includes a processor 30a, a storage unit 30b, and a communication unit 30c, as illustrated in FIG. 2. The processor 30a is a program control device, for example, a microprocessor which operates in accordance with a program installed in the MPS 30. The storage unit 30b is, for example, a storage element such as a ROM or RAM, a solid state drive (SSD), a hard disk drive (HDD), or the like. The storage unit 30b stores a program to be executed by the processor 30a, and the like. The communication unit 30c is, for example, a communication interface such as a network interface card (NIC) or a wireless LAN module. Software-defined networking (SDN) may be implemented in the communication unit 30c. The communication unit 30c exchanges data with the NOS 32 and the purchaser terminal 34.

It is assumed that the MPS 30 in this embodiment is implemented by a server group arranged in the central data center 10. The MPS 30 may be implemented by a server group arranged in the regional data center 12.

The NOS 32 in this embodiment is configured, for example, on a cloud platform and includes a processor 32a, a storage unit 32b, and a communication unit 32c, as illustrated in FIG. 2. The processor 32a is a program control device, for example, a microprocessor which operates in accordance with a program installed in the NOS 32. The storage unit 32b is, for example, a storage element such as a ROM or RAM, a solid state drive (SSD), a hard disk drive (HDD), or the like. The storage unit 32b stores a program to be executed by the processor 32a, and the like. The communication unit 32c is, for example, a communication interface such as an NIC or a wireless LAN module. Software-defined networking (SDN) may be implemented in the communication unit 32c. The communication unit 32c exchanges data with the MPS 30, the vendor terminal 36, the RAN 38, and the core network system 40.

In this embodiment, the NOS 32 is implemented by a server group arranged in the central data center 10. The NOS 32 may be implemented by a server group arranged in the regional data center 12.

In this embodiment, for example, in response to a purchase request for a network service (NS) by a purchaser, the network service for which the purchase request has been made is constructed in the RAN 38 or the core network system 40. Then, the constructed network service is provided to the purchaser.

For example, a network service such as a voice communication service, a data communication service, or the like is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to/from other users via the RAN 38 or the core network system 40. The UE 20 of the end user can also access a data network, for example, the Internet, via the RAN 38 or the core network system 40.

In addition, in this embodiment, an IoT service may be provided to an end user who uses a robot arm, a connected car, or the like. In this case, an end user who uses, for example, a robot arm, a connected car, or the like may be a purchaser of the network service in this embodiment.

In this embodiment, a container-type application execution environment, for example, Docker, is installed in the servers arranged in the central data center 10, the regional data center 12, and the edge data center 14, and containers can be deployed in those servers and operated.

The network service provided to the purchaser in this embodiment is formed of one or a plurality of functional units (for example, network function (NF)). In this embodiment, the functional unit is implemented by a containerized network function (CNF) being a container-based functional unit.

The purchaser terminal 34 in this embodiment is, for example, a general computer used by the purchaser described above, such as a smartphone, a tablet terminal, or a personal computer.

In this embodiment, for example, the above-mentioned purchaser can purchase a network service through a screen displayed on the purchaser terminal 34. In this case, the purchaser can input service requirements for a network service to be purchased on the screen. For example, the purchaser can input, on the screen, service requirements including the type of service (for example, voice communication service, data communication service, or IoT service), a service scale (for example, the number of subscribers), whether or not to allow shared slices, an opposite IP, a target area, and the like. The purchaser can also input a password on the screen.

In this embodiment, for example, when a predetermined purchase operation is executed after service requirements and a password are input, service requirement data indicating the input service requirements and password is transmitted from the purchaser terminal 34 to the MPS 30.

Then, the MPS 30 cooperates with the NOS 32 to construct, based on the service requirement data, a network service that satisfies the service requirements indicated by the service requirement data, and the constructed network service is provided to the purchaser.

As described above, according to this embodiment, a network service that satisfies various purchaser's needs is flexibly constructed. Without being aware of the detailed implementation of the network service, the purchaser can receive the provision of a desired network service by only specifying some service requirements.

Figure 3:
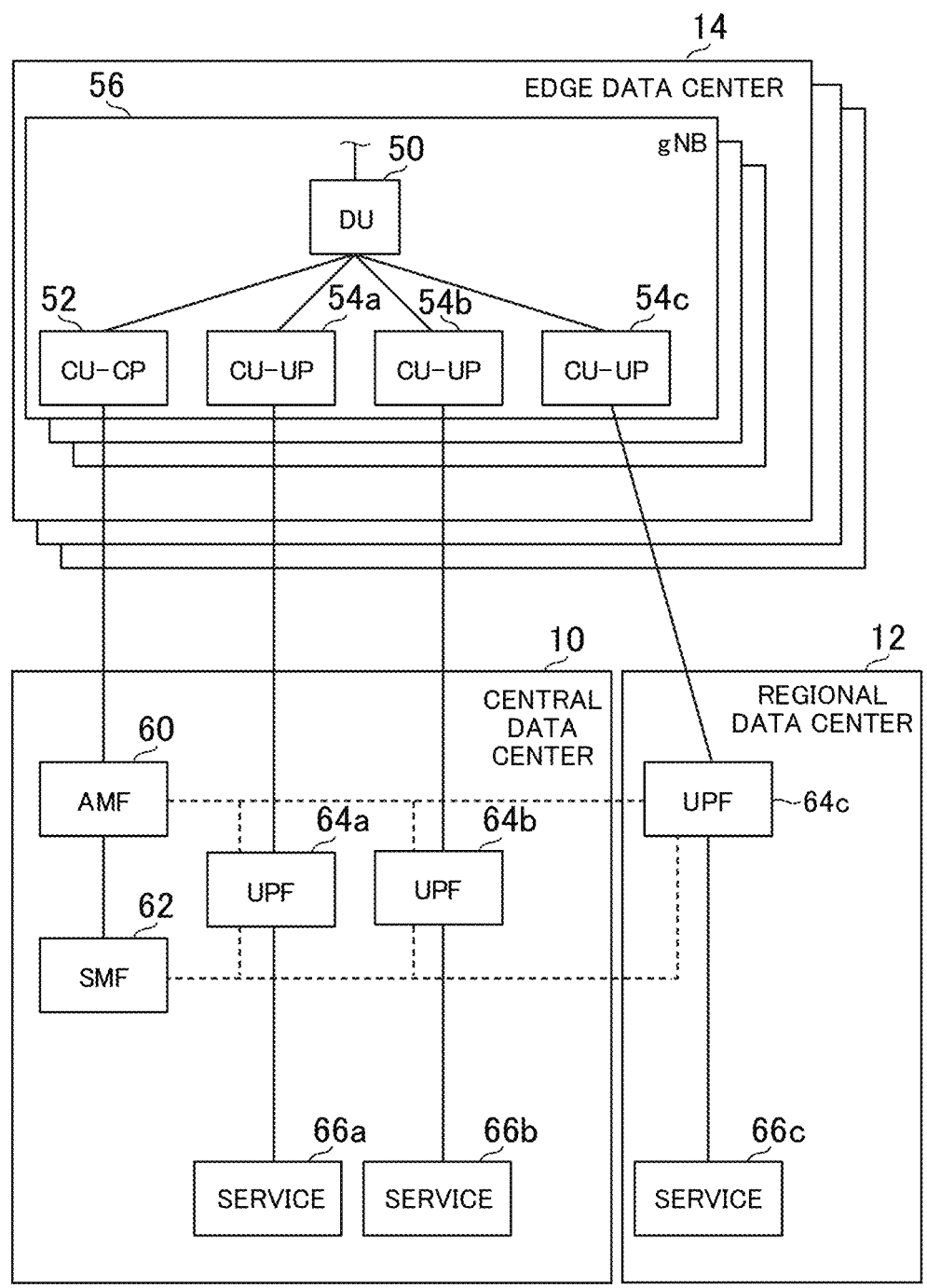
FIG. 3 is a diagram for schematically illustrating an example of a functional unit group constructed in the communication system in the one embodiment of the present invention.
Figure 4:
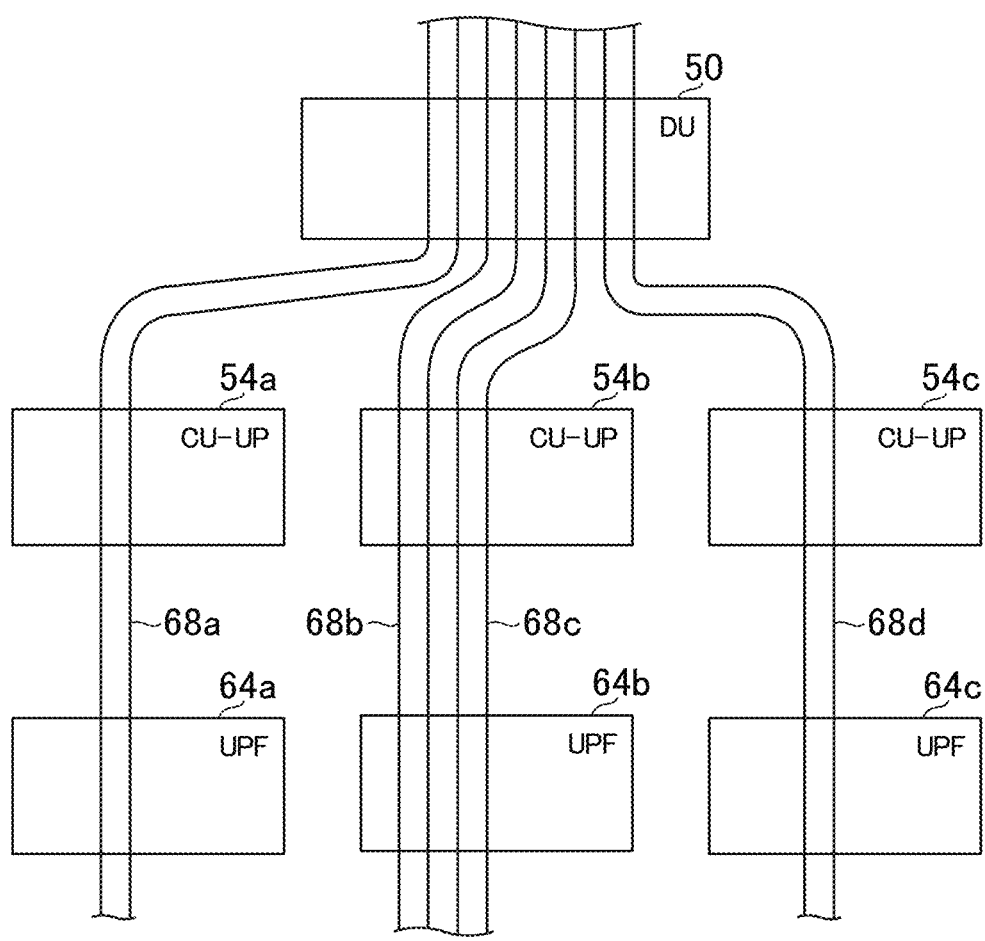
FIG. 4 is a diagram for schematically illustrating an example of a network slice to which functional units illustrated in FIG. 3 belong.

FIG. 3 is a diagram for schematically illustrating an example of a functional unit group constructed in the communication system 1 in this embodiment. FIG. 4 is a diagram for schematically illustrating an example of a network slice to which functional units illustrated in FIG. 3 belong. The functional unit groups in 5G are illustrated in FIG. 3 and FIG. 4, but functional unit groups in 4G may be constructed in the communication system 1 in this embodiment.

In the example of FIG. 3, a gNB 56 including a DU 50, a central unit-control plane (CU-CP) 52, a central unit-user plane (CU-UP) 54a, a CU-UP 54b, and a CU-UP 54c is illustrated. In this embodiment, for example, it is assumed that a plurality of gNBs including this gNB 56 are arranged in a certain edge data center 14.

Further, as illustrated in FIG. 3, an access-and-mobility management function (AMF) 60, a session management function (SMF) 62, a user plane function (UPF) 64a, and a UPF 64b are arranged in the central data center 10, and a UPF 64c is arranged in the regional data center 12.

Further, in this embodiment, the UE 20 can also access a service 66a implemented in the central data center 10 via the UPF 64a. The UE 20 can also access a service 66b implemented in the central data center 10 via the UPF 64b. The UE 20 can also access a service 66c implemented in the regional data center 12 via the UPF 64c.

As illustrated in FIG. 4, the DU 50, the CU-UP 54a, and the UPF 64a belong to a network slice 68a. Meanwhile, the DU 50, the CU-UP 54b, and the UPF 64b belong to a network slice 68b and a network slice 68c. The DU 50, the CU-UP 54c, and the UPF 64c belong to the network slice 68d. In FIG. 4, it is schematically illustrated that one DU 50, one CU-UP 54, and one UPF 64 belong to each network slice 68, but in general, a plurality of DUs 50, a plurality of CU-UPs 54, and a plurality of UPFs 64 belong to one network slice 68.

Figure 5:
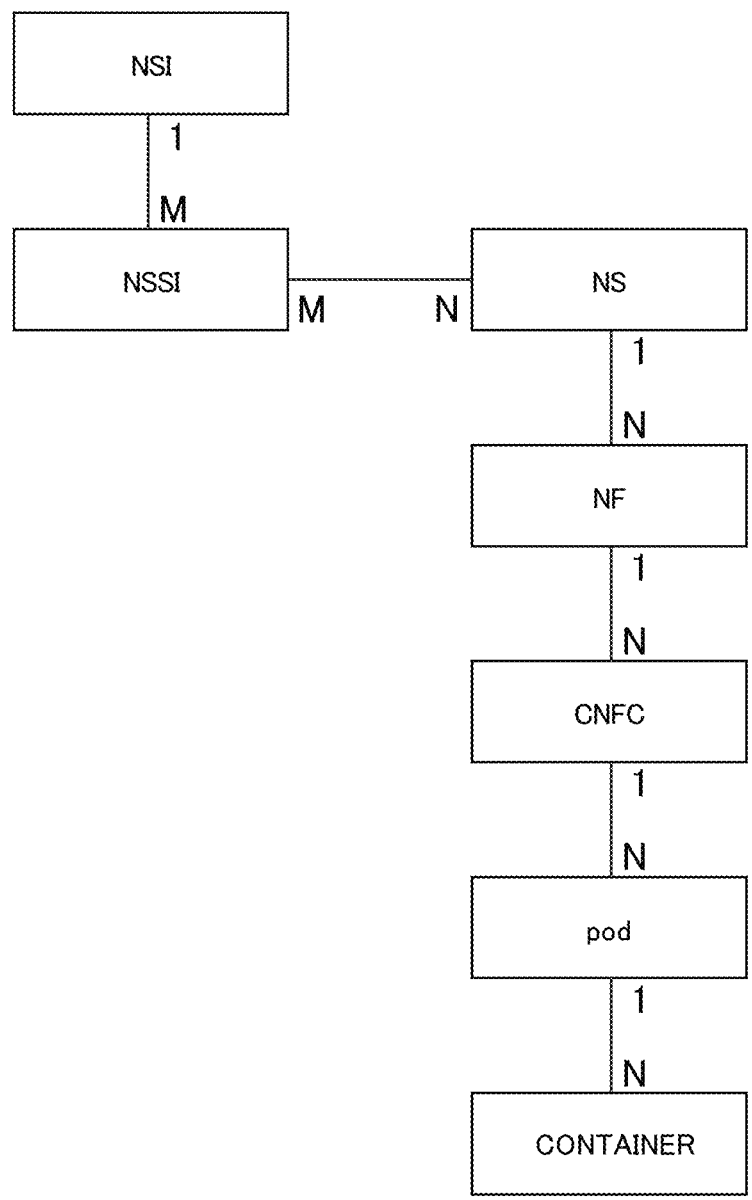
FIG. 5 is a diagram for illustrating an example of links between elements constructed in the communication system in the one embodiment of the present invention.

FIG. 5 is a diagram for schematically illustrating an example of links between elements constructed in the communication system 1 in this embodiment.

As illustrated in FIG. 5, a network service (NS), a network function (NF), a containerized network function component (CNFC), a pod, and a container have a hierarchical structure.

The NS corresponds to an element having a granularity, for example, a 5GC, an EPC, a 5G RAN (gNB), or a 4G RAN (eNB).

In 5G, the NF corresponds to an element having a granularity, for example, the AMF 60, the SMF 62, the UPF 64, the CU-CP 52, the CU-UP 54, or the DU 50. In 4G, the NF corresponds to an element having a granularity, for example, a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, for example, DU mgmt or DU processing. The CNFC may be a microservice deployed on a server as one or more containers. For example, some CNFCs may be microservices that provide a part of the functions of the DU 50, the CU-CP 52, the CU-UP 54, and the like. Some CNFCs may be microservices that provide a part of the functions of the AMF 60, the SMF 62, the UPF 64, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 5, a network slice (NSI) and a network slice subnet instance (NSSI) have a hierarchical structure.

The NSIs can be said to be end-to-end virtual circuits that span a plurality of domains (for example, from the RAN 38 to the core network system 40). Each NSI may be a slice for high-speed and high-capacity communication (for example, eMBB), a slice for high-reliability and low-latency communication (for example, URLLC), or a slice for connecting a large quantity of terminals (for example, mMTC). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 5, the NSSI and the NS generally have a many-to-many relationship.

In addition, as described with reference to FIG. 4, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

The vendor terminal 36 in this embodiment is a general computer used by a vendor, for example, a service provider related to the network service, such as a smartphone, a tablet terminal, a personal computer, or the like.

In this embodiment, the vendor is provided with a continuous integration (CI)/continuous delivery (CD) pipeline including a development environment, a verification environment, and a test environment. In this embodiment, a verified bundle file corresponding to the network service to be provided to the purchaser, which is created by the vendor, is on-boarded by an onboarding process utilizing the CI/CD pipeline.

The bundle file in this embodiment is, for example, a file obtained by compressing a file group having a predetermined directory structure (for example, a file having tar.gz format).

Figure 6:
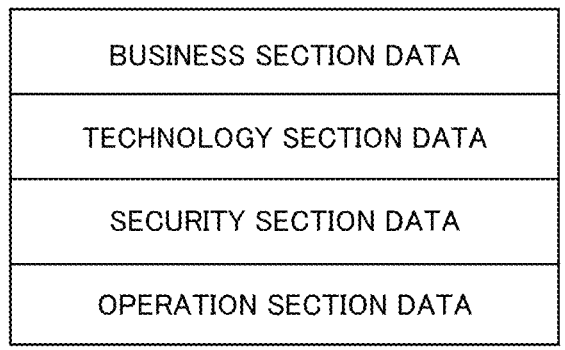
FIG. 6 is a diagram for illustrating an example of data structure of a bundle file.

FIG. 6 is a diagram for illustrating an example of data structure of the bundle file in this embodiment. As illustrated in FIG. 6, the bundle file in this embodiment includes business section data, technology section data, security section data, and operation section data.

The business section data indicates business requirements of the network service such as the name of the network service, license requirements, and the definition of service level agreement (SLA). Further, the business section data in this embodiment includes data indicating mandatory input items and optional input items for the service requirements of the network service.

The technology section data indicates, for example, the configuration of each element described with reference to FIG. 5. The technology section data also includes template data indicating a workflow script, various logics, and the like which are described below.

The security section data indicates, for example, the security definition of the network service, for example, installation credentials.

The operation section data indicates, for example, monitoring policies relating to network services, for example, a performance index value (for example, key performance indicator (KPI) metric) of a monitoring target and a monitoring interval.

The performance index values indicated by the operation section data may include performance index values regarding performance indices described in, for example, "TS 28.552, Management and orchestration; 5G performance measurements" or "TS 28.554, Management and orchestration; 5G end to end Key Performance Indicators (KPI)."

The operation section data may also include, for example, monitoring script data indicating a monitoring script. The monitoring script data may include calculation logic data indicating a calculation logic for calculating a desired performance index value.

The operation section data may also include a script template (Helm chart), a container image, and template data which are described below.

Figure 7:
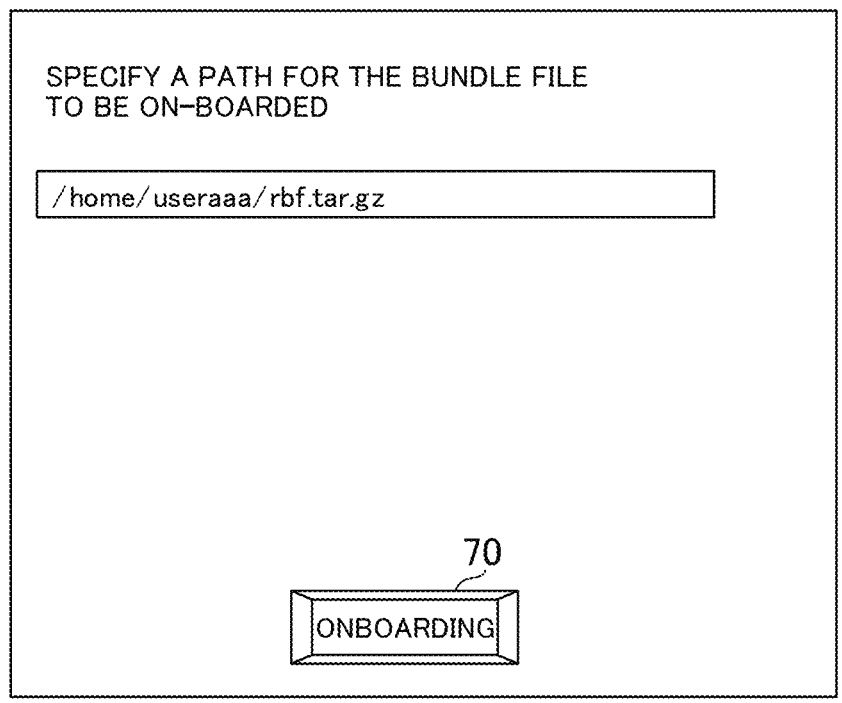
FIG. 7 is a diagram for illustrating an example of an onboarding screen.

FIG. 7 is a diagram for illustrating an example of an onboarding screen displayed on the vendor terminal 36 in this embodiment. In this embodiment, when the vendor specifies a path in which the bundle file is arranged and then clicks an "ONBOARDING" button 70, the bundle file becomes on-boarded.

As described above, in this embodiment, the vendor can easily perform onboarding of the network service without being aware of the actual location at which a developed file group is on-boarded.

The functions of the MPS 30 and the NOS 32 in this embodiment and processes to be executed by the MPS 30 and the NOS 32 are further described in the following.

Figure 8:
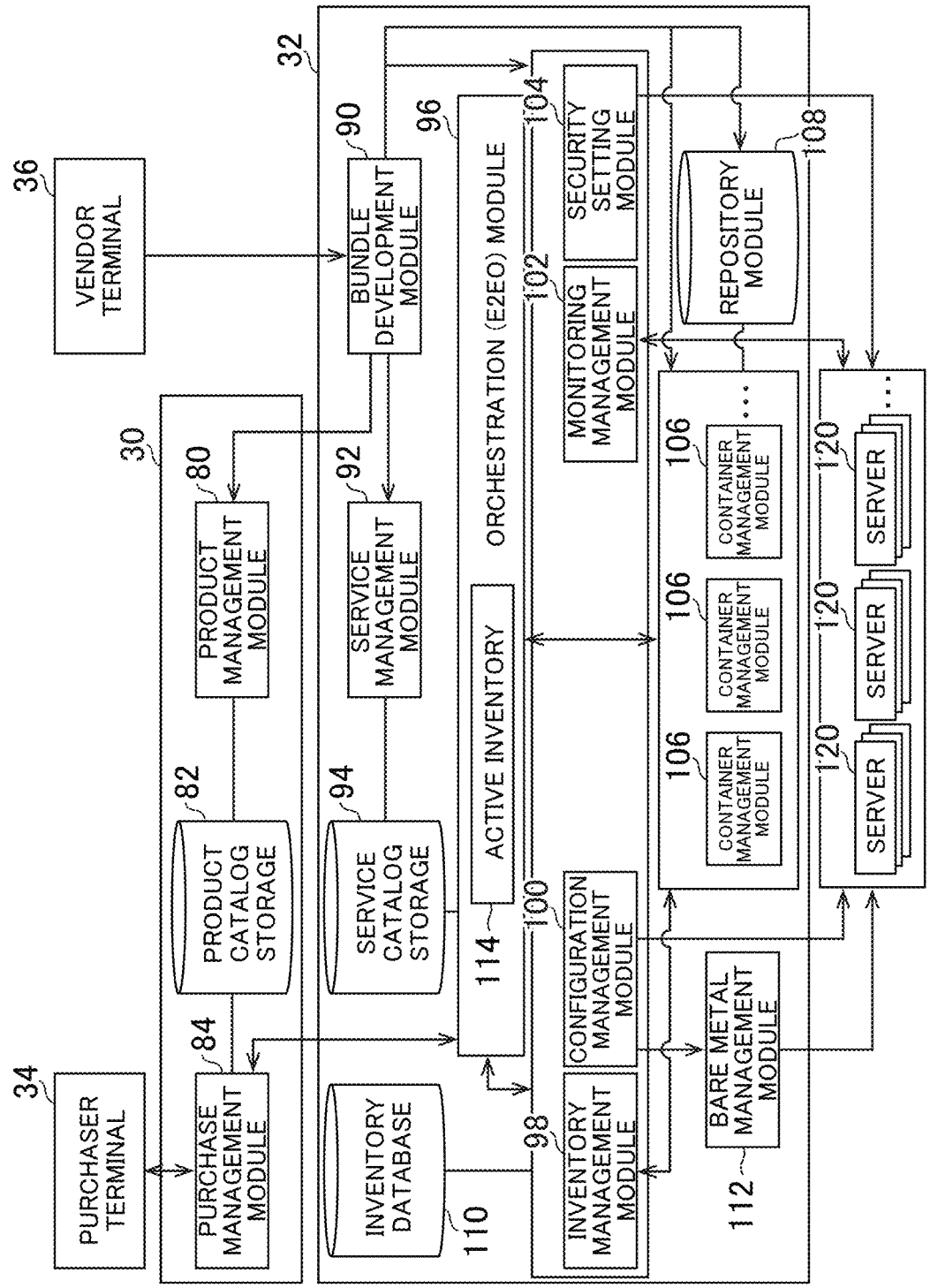
FIG. 8 is a functional block diagram for illustrating an example of functions implemented by an MPS and an NOS in the one embodiment of the present invention.

FIG. 8 is a functional block diagram for illustrating an example of functions implemented by the MPS 30 and the NOS 32 in this embodiment. The plurality of functional blocks illustrated in the block diagram of the present application can be configured from, in terms of hardware, a circuit block, a memory, and other LSIs, and in terms of software, can be implemented by the CPU executing a program loaded onto the memory. Consequently, a person skilled in the art would understand that those functional blocks can be implemented in various forms by only hardware, by only software, or by a combination of hardware and software. The MPS 30 and the NOS 32 in this embodiment are not required to implement all of the functions illustrated in FIG. 8 and may implement functions other than those illustrated in FIG. 8.

As illustrated in FIG. 8, the MPS 30 functionally includes, for example, a product management module 80, a product catalog storage 82, and a purchase management module 84.

The product management module 80 and the purchase management module 84 are implemented mainly by the processor 30a and the communication unit 30c. The product catalog storage 82 is implemented mainly by the storage unit 30b.

The above-mentioned functions may be implemented by executing, by the processor 30a, a program that is installed in the MPS 30, which is a computer, and that includes instructions corresponding to the above-mentioned functions. This program may be supplied to the MPS 30 via a computer-readable information storage medium such as an optical disc, a magnetic disk, a magnetic tape, a magneto-optical disc, a flash memory, or the like, or via the Internet or the like.

In addition, as illustrated in FIG. 8, for example, the NOS 32 functionally includes a bundle development module 90, a service management module 92, a service catalog storage 94, an orchestration (end-to-end-orchestration (E2EO)) module 96, an inventory management module 98, a configuration management module 100, a monitoring management module 102, a security setting module 104, a plurality of container management modules 106, a repository module 108, an inventory database 110, and a bare metal management module 112. In addition, the E2EO module 96 includes an active inventory 114.

The bundle development module 90 is implemented mainly by the processor 32a and the communication unit 32c. The service management module 92 and the bare metal management module 112 are each implemented mainly by the processor 32a. The service catalog storage 94, the repository module 108, and the inventory database 110 are each implemented mainly by the storage unit 32b. The E2EO module 96 is implemented mainly by the processor 32a, the storage unit 32b, and the communication unit 32c. The inventory management module 98, the configuration management module 100, the monitoring management module 102, the security setting module 104, and the container management module 106 are each implemented mainly by the processor 32a and the storage unit 32b.

The above-mentioned functions may be implemented by executing, by the processor 32a, a program that is installed in the NOS 32, which is a computer, and that includes instructions corresponding to the above-mentioned functions. This program may be supplied to the NOS 32 via a computer-readable information storage medium such as an optical disc, a magnetic disk, a magnetic tape, a magneto-optical disc, a flash memory, or the like, or via the Internet or the like.

Further, FIG. 8 also shows a plurality of servers 120 included in the RANs 38 and the core network systems 40 illustrated in FIG. 2 and dispersedly arranged at various locations. Each of the plurality of container management modules 106 in this embodiment is associated with a server group that is a part of the plurality of servers 120.

In each of the plurality of container management modules 106 in this embodiment, for example, a container management tool such as Kubernetes, and a package manager such as Helm are installed. The container management module 106 executes life cycle management of a container including the construction of the container such as the deployment and setting of the container for a server group (a plurality of servers 120) associated with the container management module 106.

The container management module 106 is not required to be included in the NOS 32. The container management module 106 may be provided in, for example, a server 120 (that is, the RAN 38 or the core network system 40) managed by the container management module 106, or a server that is annexed to the server 120.

For example, in this embodiment, the bundle development module 90 receives a bundle file from the vendor terminal 36. Then, for example, in this embodiment, the bundle development module 90 generates a data group having data structure illustrated in FIG. 9, based on the received bundle file. The data group illustrated in FIG. 9 is obtained by reconstructing the contents of the bundle file received by the bundle development module 90.

As illustrated in FIG. 9, the data group generated by the bundle development module 90 includes product catalog data, service catalog data, inventory template data, CM template data, monitoring script data, security script data, Helm chart data, and container image data.

The product catalog data is, for example, data corresponding to business section data included in a bundle file. As described above, the product catalog data indicates information regarding business requirements of the network service, such as the name of the network service displayed on the screen of the purchaser terminal 34, license requirements, and the definition of the service level agreement (SLA).

Further, the product catalog data in this embodiment includes data indicating mandatory input items and optional input items for the service requirements of the network service. In this embodiment, a screen to be displayed on the purchaser terminal 34 is generated based on, for example, the product catalog data.

The service catalog data is, for example, data corresponding to a part of the technology section data included in the bundle file. The service catalog data contains a workflow script for constructing the network service.

The service catalog data may also include information relating to a threshold value (for example, threshold value for abnormality detection) to be compared to the calculated performance index value.

Further, the service catalog data may include requirement configuration correspondence data indicating the correspondence between a value of the above-mentioned service requirement data and the configuration of a functional unit group (for example, NF group) constructed in response to a purchase request.

For example, the service catalog data may include requirement configuration correspondence data indicating the correspondence between the value of the service requirement data, the type of a functional unit group, and the number of functional units for each type. The requirement configuration correspondence data may indicate correspondences between, for example, "the number n1 of subscribers and one UPF," "the number n2 of subscribers and one SMF," "the number n3 of subscribers and one AMF," "the number n4 of subscribers and one CU-CP," "the number n5 of subscribers and one CU-UP," and "the number n6 of subscribers and one DU." What is associated with the service requirement data is not limited to the type and the number of 5G components, and the service requirement data and the type and the number of 4G components may be associated with each other.

Further, for example, the requirement configuration correspondence data may indicate the correspondence between the value of the service requirement data and a location at which each functional unit included in a functional unit group constructed in response to a purchase request is to be constructed. In this case, the location associated with the value of the service requirement data in the requirement configuration correspondence data may be different depending on functional units included in the functional unit group to be constructed.

In addition, the service catalog data may include, for example, service template data indicating the logic to be used by the E2EO module 96, which includes information required for the E2EO module 96 to construct the network service. Specifically, for example, the service template data includes information defining the NS, the NF, and the CNFC, and information indicating an NS-NF-CNFC correspondence relationship.

The service catalog data may also include, for example, a slice template indicating the logic to be used by the E2EO module 96, which includes information required for the E2EO module 96 to execute the instantiation of the network slice.

The slice template data includes information on a "generic network slice template" defined by the GSM Association (GSMA) ("GSM is a trademark"). Specifically, the slice template data includes network slice template data (NST), network slice subnet template data (NSST), and network service template data. The slice template includes data information indicating the hierarchical structure of those elements which is illustrated in FIG. 5.

The inventory template data is, for example, data corresponding to a part of the technology section data and a part of the security section data included in the bundle file. The inventory template data is, for example, template data indicating the logic used by the inventory management module 98.

The CM template data is, for example, data corresponding to a part of the technology section data and a part of the operation section data included in the bundle file, and is, for example, template data indicating the logic used by the configuration management module 100.

The monitoring script data is, for example, data corresponding to a part of the operation section data included in the bundle file, and is, for example, data indicating a monitoring script executed by the monitoring management module 102. As described above, the monitoring script data may include the above-mentioned calculation logic data.

The security script data is, for example, data corresponding to a part of the security section data included in the bundle file, and is, for example, data indicating a script regarding security executed by the security setting module 104.

The Helm chart data is, for example, data corresponding to a part of the operation section data included in the bundle file, and is data indicating a script template (Helm chart) used by the container management module 106.

The container image data is, for example, data corresponding to a part of the operation section data included in the bundle file, and is, for example, data of container image of a container included in the functional unit group that achieves the network service. The container image data includes one or a plurality of container images. A container image ID, which is an identifier of the container image, is linked to each of the one or the plurality of container images.

In this embodiment, in response to the reception of a bundle file, the bundle development module 90 determines a bundle ID that corresponds to a data group generated based on the bundle file. A bundle ID is uniquely assigned to each generated data group.

Then, the bundle development module 90 links the product catalog data included in the data group corresponding to the bundle ID to the determined bundle ID, and then transmits the product catalog data to the MPS 30.

Further, the bundle development module 90 outputs the service catalog data included in the data group to the service management module 92 after linking the service catalog data to the determined bundle ID. Then, the service management module 92 stores the service catalog data in the service catalog storage 94.

Further, the bundle development module 90 links the inventory template data, the CM template data, the monitoring script data, the security script data, the Helm chart data, and the container image data to the bundle ID corresponding to the data group, and then stores the pieces of data in the inventory management module 98, the configuration management module 100, the monitoring management module 102, the security setting module 104, the container management module 106, and the repository module 108, respectively.

As described above, in this embodiment, the product catalog data, the service catalog data, the inventory template data, the CM template data, the monitoring script data, the security script data, the Helm chart data, and the container image data become linked to one another by the bundle ID.

Further, in this embodiment, the vendor can easily provide the network service by a simple operation of, for example, specifying a path of the bundle file.

In this embodiment, for example, the product management module 80 receives the product catalog data linked to the bundle ID transmitted from the bundle development module 90. Then, the product management module 80 stores the received product catalog data in the product catalog storage 82.

In this embodiment, for example, the product catalog storage 82 stores the product catalog data linked to the bundle ID as described above.

In this embodiment, for example, the purchase management module 84 receives from the purchaser terminal 34 a network service construction request, such as a purchase request for a network service, which is linked to the bundle ID and the service requirement data. A bundle ID linked to a purchase request is hereinafter referred to as "purchase bundle ID," and service requirement data linked to a purchase request is hereinafter referred to as "purchase service requirement data."

Then, the purchase management module 84 transmits the purchase service requirement data linked to the purchase bundle ID to the E2EO module 96 in response to the reception of the purchase request described above. The E2EO module 96 receives the purchase service requirement data indicating the service requirements.

In this embodiment, the inventory database 110 is, for example, a database in which inventory information for a plurality of servers 120 managed by the NOS 32 and arranged in the RAN 38 and the core network system 40 is stored.

In this embodiment, for example, the inventory database 110 stores inventory data including the physical inventory data and the logical inventory data. The inventory data indicates the current statuses of the configuration of an element group included in the communication system 1 and the link between the elements. In addition, the inventory data indicates the status of resources managed by the NOS 32 (for example, resource usage status).

Figure 10:
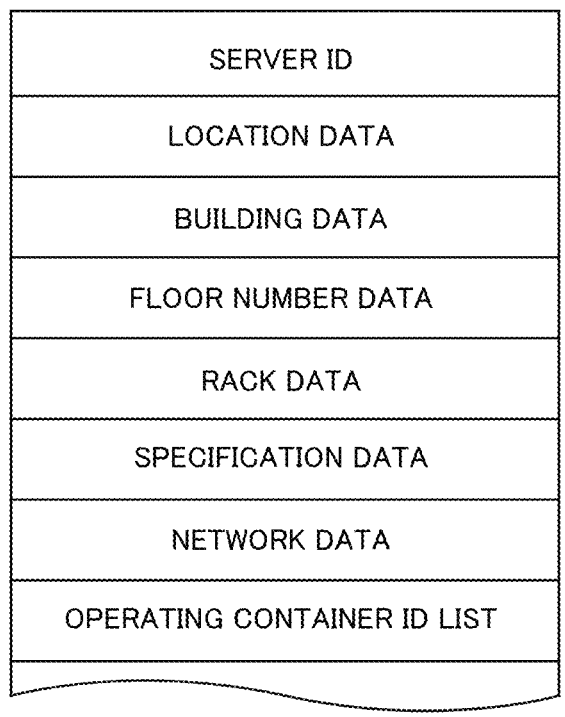
FIG. 10 is a diagram for illustrating an example of data structure of physical inventory data.

FIG. 10 is a diagram for illustrating an example of the data structure of the physical inventory data. The physical inventory data illustrated in FIG. 10 is associated with one server 120. The physical inventory data illustrated in FIG. 10 includes, for example, a server ID, location data, building data, floor number data, rack data, specification data, network data, and operating container ID list.

The server ID included in the physical inventory data is, for example, an identifier of the server 120 associated with the physical inventory data.

The location data included in the physical inventory data is, for example, data indicating the location of the server 120 (for example, the address of the location) associated with the physical inventory data.

The building data included in the physical inventory data is, for example, data indicating a building (for example, a building name) in which the server 120 associated with the physical inventory data is arranged.

The floor number data included in the physical inventory data is, for example, data indicating a floor number at which the server 120 associated with the physical inventory data is arranged.

The rack data included in the physical inventory data is, for example, an identifier of a rack in which the server 120 associated with the physical inventory data is arranged.

The specification data included in the physical inventory data is data indicating the specifications of the server 120, such as the number of cores, the memory capacity, and the hard disk capacity, of the server 120 associated with the physical inventory data.

The network data included in the physical inventory data is, for example, data indicating an NIC included in the server 120 associated with the physical inventory data, the number of ports included in the NIC, and the like.

The operating container ID list included in the physical inventory data is, for example, data indicating a list of identifiers (container IDs) of one or a plurality of container instances operating in the server 120 associated with the physical inventory data.

The operating container ID list included in the physical inventory data in this embodiment can be said to be data indicating a part of a current status of hardware on which a software element (container in the above-mentioned example) included in the communication system 1 is operating. The inventory data may include data other than the operating container ID list, which indicates the current status of the hardware on which the software element included in the communication system 1 is operating. For example, the inventory data may indicate the current status of the hardware on which the software element, such as an NS, an NF, a CNFC, a pod, a network slice (NSI), or a network slice subnet instance (NSSI), is operating.

In addition, the logical inventory data includes topology data for a plurality of elements included in the communication system 1, which indicates the current status of such link between the elements as illustrated in FIG. 5. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

Figure 11:
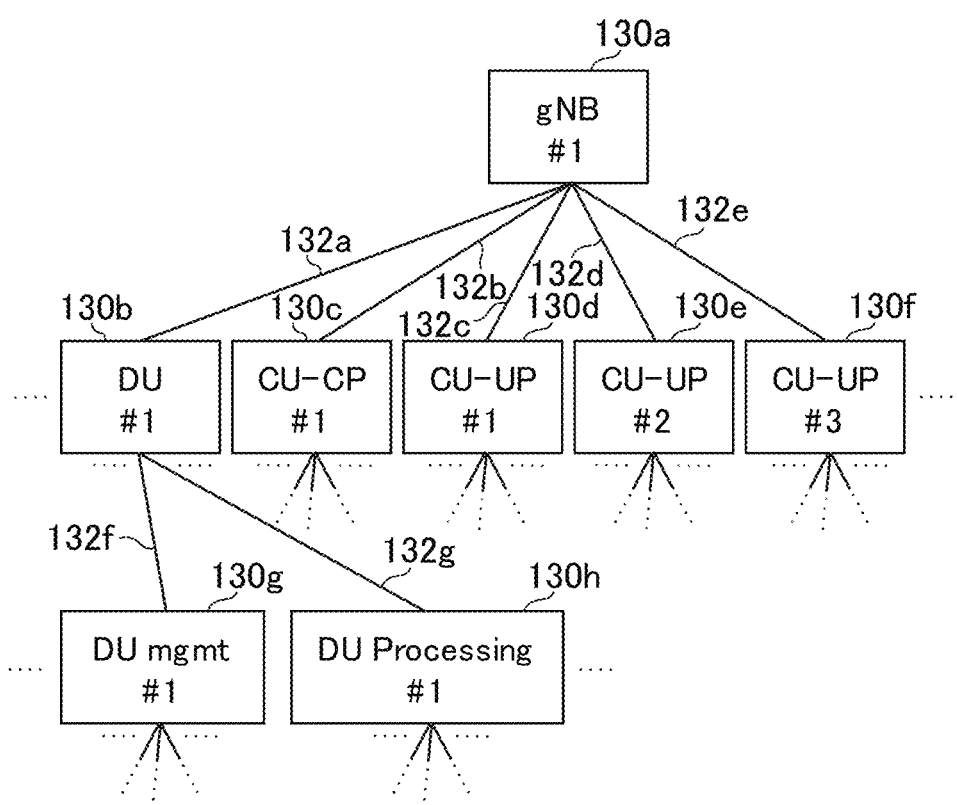
FIG. 11 is a diagram for schematically illustrating an example of topology data.

FIG. 11 is a diagram for schematically illustrating an example of the topology data. The topology data illustrated in FIG. 11 schematically indicates an example of the current statuses of the gNB 56 illustrated in FIG. 3 and the link between the elements (hierarchical structure) between the element group under the control thereof.

Figure 12:
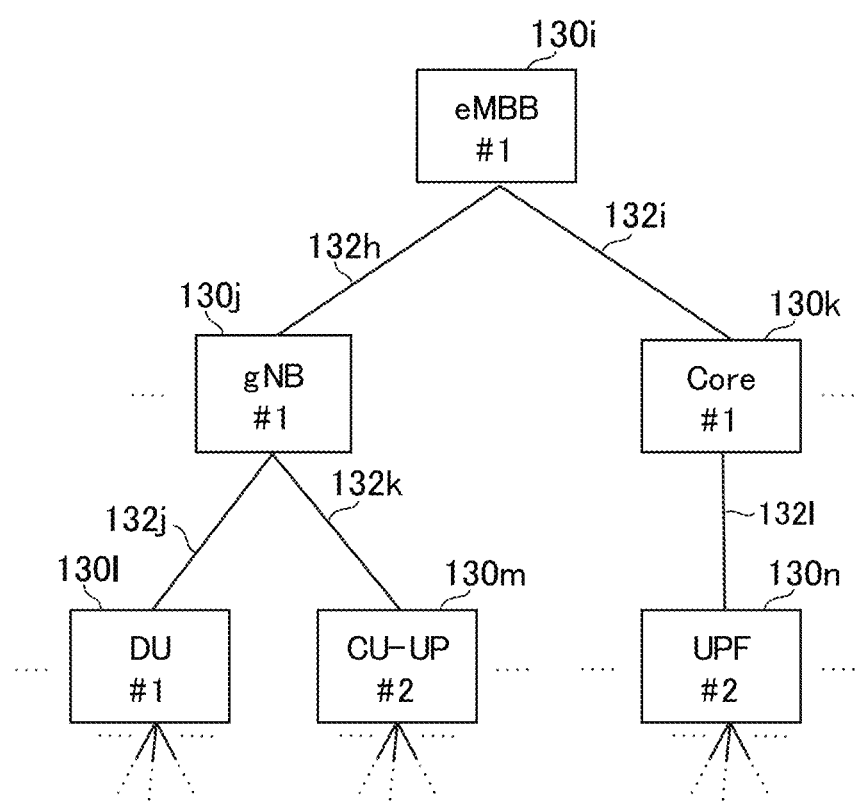
FIG. 12 is a diagram for schematically illustrating an example of the topology data.

FIG. 12 is a diagram for schematically illustrating another example of the topology data. The topology data illustrated in FIG. 12 schematically indicates an example of the current statuses of the network slice 68b illustrated in FIG. 4 and the elements (for example, NS and NF) belonging to the network slice 68b.

In FIG. 11 and FIG. 12, the topology data is represented as data including nodes 130 associated with elements included in the communication system 1 and links 132 each connecting the nodes 130 associated with respective two elements linked to each other. More specifically, in FIG. 11 and FIG. 12, the topology data is represented as tree structure data in which a hierarchical structure between the elements is represented by a parent-child relationship.

A node 130a having an identifier of "gNB #1," which is illustrated in FIG. 11, is associated with the gNB 56 illustrated in FIG. 3. A node 130b having an identifier of "DU #1" is associated with the DU 50 illustrated in FIG. 3. A node 130c having an identifier of "CU-CP #1" is associated with the CU-CP 52 illustrated in FIG. 3. A node 130d having the identifier of "CU-UP #1" is associated with the CU-UP 54a illustrated in FIG. 3. A node 130e having an identifier of "CU-UP #2" is associated with the CU-UP 54b illustrated in FIG. 3. A node 130f having an identifier of "CU-UP #3" is associated with the CU-UP 54c illustrated in FIG. 3. FIG. 11 also shows a node 130g and a node 130h corresponding to the CNFCs included in the DU 50.

FIG. 11 also shows a link 132a connecting the node 130a and the node 130b that is a node 130 being a child of the node 130a. FIG. 11 also shows a link 132b connecting the node 130a and the node 130c that is a node 130 being a child of the node 130a. FIG. 11 also shows a link 132c connecting the node 130a and the node 130d that is a node 130 being a child of the node 130a. FIG. 11 also shows a link 132d connecting the node 130a and the node 130e that is a node 130 being a child of the node 130a. FIG. 11 also shows a link 132e connecting the node 130a and the node 130f that is a node 130 being a child of the node 130a. FIG. 11 also shows a link 132f connecting the node 130b and the node 130g that is a node 130 being a child of the node 130b. FIG. 11 also shows a link 132g connecting the node 130b and the node 130h that is a node 130 being a child of the node 130b.

Further, a node 130i having an identifier of "eMBB #1," which is illustrated in FIG. 12, is associated with the network slice 68b illustrated in FIG. 4. A node 130j having the identifier of "gNB #1" is associated with the gNB 56 illustrated in FIG. 3. A node 130k having an identifier of "Core #1" is associated with the NS of the core network system 40 belonging to the network slice 68b. A node 130l having the identifier of "DU #1" is associated with the DU 50 illustrated in FIG. 3 and FIG. 4. A node 130m having the identifier of "CU-UP #2" is associated with the CU-UP 54b illustrated in FIG. 3 and FIG. 4. A node 130n having an identifier of "UPF #2" is associated with the UPF 64b illustrated in FIG. 3 and FIG. 4.

FIG. 12 also shows a link 132h connecting the node 130i and the node 130j that is a node 130 being a child of the node 130i. FIG. 12 also shows a link 132i connecting the node 130i and the node 130k that is a node 130 being a child of the node 130i. FIG. 12 also shows a link 132j connecting the node 130j and the node 130l that is a node 130 being a child of the node 130j. FIG. 12 also shows a link 132k connecting the node 130j and the node 130m that is a node 130 being a child of the node 130j. FIG. 12 also shows a link 132l connecting the node 130k and the node 130n that is a node 130 being a child of the node 130k.

In addition, the logical inventory data may include NSI data being data indicating attributes such as an identifier of an instance of a network slice and the type of the network slice. In addition, the logical inventory data may include NSSI data being data indicating attributes such as an identifier of an instance of a network slice subnet and the type of the network subnet.

The logical inventory data may also include NS data being data indicating attributes such as an identifier of an instance of an NS and the type of the NS. The logical inventory data may also include NF data indicating attributes such as an identifier of an instance of an NE and the type of the NF. The logical inventory data may also include CNFC data indicating attributes such as the identifier of a CNFC instance and the type of the CNFC. The logical inventory data may also include pod data indicating attributes such as an identifier of an instance of a pod included in the CNFC and the type of the pod. The logical inventory data may also include container data indicating attributes such as a container ID of an instance of a container included in the pod and the type of the container.

With the container ID of the container data included in the logical inventory data and the container ID included in the operating container ID list included in the physical inventory data, an instance of the container and the server 120 on which the instance of the container is operating become linked to each other.

Further, data indicating various attributes such as the host name and the IP address may be set in the above-mentioned data included in the logical inventory data. For example, the container data may include data indicating the IP address of a container corresponding to the container data. Further, for example, the CNFC data may include data indicating the IP address and the host name of a CNFC indicated by the CNFC data.

The logical inventory data may also include data indicating NSSAI including one or a plurality of pieces of S-NSSAI, which is set for each NF.

Further, in this embodiment, at least a part of the inventory data stored in the inventory database 110 is also stored in the active inventory 114. The inventory data stored in the active inventory 114 and the inventory data stored in the inventory database 110 are basically synchronized with each other. When a process such as registration, update, or deletion of inventory data occurs, the inventory management module 98 executes the process on the inventory database 110 after executing the process on the active inventory 114.

Further, the inventory management module 98 can appropriately grasp the resource status in cooperation with the container management module 106. Then, the inventory management module 98 appropriately updates the inventory data stored in the active inventory 114 and the inventory database 110 based on the latest resource status.

In this embodiment, the E2EO module 96 and the inventory management module 98 identify the configuration of the element group for achieving a network service that satisfies the service requirements indicated by the service requirement data based on, for example, the inventory data and the service requirement data received from the purchase management module 84.

For example, the E2EO module 96 acquires, from the service catalog storage 94, service catalog data corresponding to a purchase bundle ID linked to the purchase service requirement data received from the purchase management module 84. The E2EO module 96 then executes a workflow script indicated by the service catalog data.

[Construction of Functional Unit Group corresponding to Purchase of Network Service]

The E2EO module 96 and the inventory management module 98 determine the configuration of a network service to be purchased based on the purchase service requirement data received from the purchase management module 84, the service catalog data linked to the purchase bundle ID, the inventory template data linked to the purchase bundle ID, and the inventory data.

In this case, for example, the E2EO module 96 may identify the respective types of functional unit groups that achieve the network service to be purchased and the number of functional units for each type, based on the purchased service requirement data and the requirement configuration correspondence data included in the service catalog data.

Further, based on the purchase service requirement data, the E2EO module 96 may identify the location at which each of the functional units included in the constructed functional unit group is constructed. For example, the E2EO module 96 may determine the location of each functional unit included in the constructed functional unit group based on the target area indicated by the purchase service requirement data and the requirement configuration correspondence data included in the service catalog data. A different location may be determined for each functional unit.

Further, based on the purchase service requirement data, the E2EO module 96 may identify, for each of a plurality of locations, the type and the number of functional units constructed at the location. In this case, in accordance with the location that is identified based on the purchase service requirement data, the E2EO module 96 may determine the number of functional units for each type that are constructed at the location. Further, the E2EO module 96 may determine the number of functional units for each type that are constructed for each location based on a weight set for each location identified based on the purchase service requirement data.

An example of the weight set for each location is the population of an area covered by one or a plurality of cells under the control of the data center linked to the location. That is, in determining the number of functional units of each type, which are constructed for each location, weighting may be performed based on the population of the covered area. For example, as the population of the area covered by a location becomes larger, more functional units may be allocated at the location.

In this case, the E2EO module 96 may store assumed busy level data for each of a plurality of locations, which indicates the population of the area covered by one or a plurality of cells under the control of the data center linked to the location. The value of the assumed busy level data is an example of the weight set for each location described above. The assumed busy level data for the data center of the core network system 40 may indicate, for example, the population of the area covered by the cells of the RAN 38 communicating to/from the core network system 40. For example, as the population at a location which is indicated by the assumed busy level data becomes larger, more functional units may be deployed at the location.

Then, the E2EO module 96 and the inventory management module 98 register the inventory data associated with the newly constructed element group in the active inventory 114 and the inventory database 110 based on the number and the location of functional units, which are determined as described above, and the inventory data.

In this case, the inventory management module 98 may determine a host name and an IP address that are to be allocated to the newly constructed element group based on the inventory data. In this case, for example, a host name and an IP address may be determined so as not to overlap with the already used host name and the already used IP address. Then, the inventory data in which the determined host name and IP address are set may be registered in the active inventory 114 and the inventory database 110.

In addition, the E2EO module 96 and the inventory management module 98 may identify the existing element group to which a new setting is to be input, based on the number and the location of functional units, which are determined as described above, and the inventory data. Then, the inventory data indicating the new setting to be input may be registered in the active inventory 114 and the inventory database 110.

A planned attribute is set for the inventory data registered in response to the reception of the service requirement data as described above. The inventory data for which the planned attribute is set is hereinafter referred to as "planned data." The planned data registered in this manner is linked to an inventory key being an identifier of the planned data, the above-mentioned purchase bundle ID, and a user ID being an identifier of the purchaser (user) who has made the purchase request.

The E2EO module 96 and the inventory management module 98 may determine whether to construct a new element or to use an existing element as an element included in the purchased NS based on the current status (for example, operation status availability status) of the element group indicated by the inventory data. Then, the E2EO module 96 and the inventory management module 98 may register, based on the determination, in the active inventory 114 and the inventory database 110, the planned data associated with the newly constructed element group and the planned data indicating a new setting to be input to the existing elements.

In embodiment, this based on, for example, the configuration of the element group identified as described above and template data in which the configuration is acceptable as a parameter, the E2EO module 96 and the configuration management module 100 identify a construction procedure of the element group. The construction procedure includes, for example, a procedure of container configuration management such as deploying a container and setting the deployed container and a container related to the deployed container. This process is executed, for example, with the execution of the workflow script by the E2EO module 96 as a trigger.

Then, the E2EO module 96, the configuration management module 100, and the container management module 106 construct an element group that achieves the network service based on the configuration identified as described above. The E2EO module 96, the configuration management module 100, and the container management module 106 construct an element group by executing, for example, the identified construction procedure. This process is also executed, for example, with the execution of the workflow script by the E2EO module 96 as a trigger. Each of the elements included in the element group may be constructed at a location identified for the element. Further, for example, the number of element groups identified based on the purchase service requirement data may be constructed. Further, for example, for each of a plurality of locations, an identified number of elements of a type identified for the location may be constructed.

The configuration management module 100 and the bare metal management module 112 secure, for example, a hardware resource (for example, the server 120 in this case) in which a new element group is deployed.

Further, the configuration management module 100 and the bare metal management module 112 perform a system software setup in accordance with a specific type of element on an unused hardware resource. In this embodiment, for example, the configuration management module 100 or the bare metal management module 112 stores a script (for example, an Ansible script) for performing a setup for the above-mentioned specific type of element. The script describes, for example, a procedure of installing a host OS, which have a specific type or a specific version, serving as a platform of a container execution environment, a procedure of setting a kernel of the host OS, and a procedure of setting a basic input output system (BIOS). Then, by the execution of the script by the bare metal management module 112, a system software setup in accordance with the specific type of element is performed on a free server. For example, the setup of the host OS and the BIOS of the container execution environment is performed on the free server.

When the hardware resource for deploying a new element group is secured, the E2EO module 96 instructs the container management module 106 to deploy the new element group, for example, based on the above-mentioned planned data and service template data linked to the purchase bundle ID stored in the E2EO module 96. The service template data can accept a part or all of the planned data as a parameter.

A CNF descriptor (CNFD) is an example of the above-mentioned service template data. The E2EO module 96 generates, for example, a day 0 parameter (CNF instance) based on the planned data and the CNFD. For example, the day 0 parameter in which a host name and the value of an IP address of the CNFD are set is generated.

The CNFD may include a template associated with each of a plurality of deployment flavors. Then, for example, the E2EO module 96 may generate the day 0 parameter based on a template corresponding to a deployment flavor in accordance with the purchase service requirement data.

The E2EO module 96 may identify the location of the output destination of the day 0 parameter. For example, one or a plurality of container management modules 106 that serve as output destinations of the day 0 parameter may be identified. For example, a container management module 106 associated with a server 120 arranged at the location of an element indicated by the planned data may be identified. Then, a day 0 parameter that is output to each of the identified locations may be generated. For example, a day 0 parameter that is output to each of one or a plurality of container management modules 106 that serve as the output destinations may be generated.

Then, the E2EO module 96 outputs each of the generated one or plurality of day 0 parameters to a container management module 106 serving as the location of the output destination of the day 0 parameter. A purchase bundle ID is linked to the day 0 parameter.

Then, the container management module 106 deploys a new element group based on the received day 0 parameter. The container management module 106 identifies a container image to be deployed and the server 120 in which the container is deployed, for example, based on Helm chart data associated with the purchase bundle ID and on the received day 0 parameter. Then, the container management module 106 acquires the container image from the repository module 108 and deploys a container corresponding to the container image in the identified server 120. For example, a manifest file is generated based on the Helm chart data associated with the purchase bundle ID and on the received day 0 parameter. Then, the deployment of a container is executed through use of the manifest file.

In this embodiment, each of the plurality of servers 120 may be allocated to a resource pool. In this case, the container management module 106 may identify a container image to be deployed and a resource pool in which the container is deployed, for example, based on Helm chart data associated with the purchase bundle ID and on the received day 0 parameter. Then, the container management module 106 may acquire the container image from the repository module 108 and deploy a container corresponding to the container image in the identified resource pool.

Further, the configuration management module 100 generates planned CM data including a day 1 parameter, for example, based on the above-mentioned planned data and CM template data stored in the configuration management module 100 and linked to the purchase bundle ID. The CM template data can accept a part or all of the planned data as a parameter.

The day 1 parameter indicates, for example, a configuration management procedure, for example, the settings of a deployed element group and at least one element related to the element group (for example, an element communicating to/from the deployed element group). A day 1 parameter relating to the RAN 38 indicates, for example, radio field intensity, the direction and angle of the antenna 16, a serial number, and the like. A day 1 parameter relating to a UPF indicates, for example, information indicating an opposite node.

Then, the configuration management module 100 executes configuration management, for example, the setting of the element group, based on the day 1 parameter included in the generated planned CM data. Those processes are executed, for example, with the execution of the workflow script by the E2EO module 96 as a trigger. In this embodiment, for example, configuration management is executed for a newly constructed element group or an existing element to which a new setting is to be input.

Then, the E2EO module 96 executes, for example, instantiation of a network slice pertaining to a network service to be purchased, based on the above-mentioned planned data and slice template data linked to the purchase bundle ID stored in the E2EO module 96. The slice template data can accept a part or all of the planned data as a parameter. This process is executed, for example, with the execution of the workflow script by the E2EO module 96 as a trigger.

The E2EO module 96 includes a network slice management function (NSMF) and a network slice sub-network management function (NSSMF) described in the 3GPP specification "TS28 533." The NSMF is a function for generating and managing network slices, and provides NSI management. The NSSMF is a function for generating and managing network slice subnets forming a part of a network slice, and provides NSSI management.

The E2EO module 96 may output a configuration management instruction related to the instantiation of the network slice to the configuration management module 100. Then, the configuration management module 100 may execute configuration management, for example, settings in accordance with the configuration management instruction.

For example, the configuration management module 100 constructs the NSI and the NSSI on each server 120 by using known segment routing technology (for example, SRv6 (segment routing IPV6)) based on the setting information passed from the E2EO module 96. For example, the configuration management module 100 may generate an NSI and NSSI extending over a plurality of NFs to be set by issuing, to the plurality of NEs to be set, a command to set a common virtual local area network (VLAN) and a command to assign a bandwidth and a priority indicated by the setting information to the VLAN.

Further, for example, the configuration management module 100 may execute configuration management regarding new element groups when the deployment of the new element groups is completed, and then execute configuration management related to the instantiation of the network slice.

As another example, the configuration management module 100 may update a once-generated day 1 parameter based on the configuration management instruction received from the E2EO module 96. Then, the configuration management module 100 may collectively perform the configuration management related to the new element groups and the instantiation of the network slice.

In this embodiment, for example, the monitoring management module 102 identifies a monitoring policy indicated by the purchase service requirement data based on the above-mentioned planned data and monitoring script data linked to the purchase bundle ID stored in the monitoring management module 102. Then, the monitoring management module 102 executes a monitoring setting in accordance with the identified monitoring policy.

Then, in accordance with the identified monitoring policy, the monitoring management module 102 monitors an element group which is constructed. For example, monitoring of a monitoring target indicated by the purchase service requirement data may be executed at a monitoring interval indicated by the purchase service requirement data. This process is executed, for example, with the execution of the workflow script by the E2EO module 96 as a trigger.

In this embodiment, the monitoring management module 102 executes monitoring at various levels, for example, a slice level, an NS level, an NF level, a CNFC level, and a level of hardware, for example, the server 120.

For example, the monitoring management module 102 may set a module for outputting metric data in the hardware, for example, the server 120, or an element illustrated in FIG. 5 so that monitoring can be performed at the various levels described above. In this case, for example, the NF may output the metric data indicating a metric that can be measured by the NF to the monitoring management module 102. Further, the server 120 may output the metric data indicating a metric relating to the hardware that can be measured by the server 120 to the monitoring management module 102.

In addition, for example, the monitoring management module 102 may deploy, in the server 120, a sidecar container for aggregating the metric data indicating the metrics output from a plurality of containers in units of CNFCs (microservices). This sidecar container may include an agent called "exporter." The monitoring management module 102 may repeatedly execute a process for acquiring the metric data aggregated in units of microservices from the sidecar container, at monitoring intervals indicated by the purchase service requirement data through use of the mechanism of Prometheus.

Further, the elements such as the network slice, the NS, the NF, the CNFC that are included in the communication system 1 and the hardware, for example, the server 120, notify the monitoring management module 102 of various alerts (for example, notify the monitoring management module 102 of an alert with the occurrence of a failure as a trigger).

For example, in this embodiment, the security setting module 104 executes a security setting, for example, a password setting, in accordance with the value of the purchase service requirement data based on, for example, the above-mentioned planned data and the security script data stored in the security setting module 104 and linked to the purchase bundle ID.

When the inventory management module 98 ends a series of processes including the construction of the element group and the configuration management in the above-mentioned manner, the inventory management module 98 updates the inventory data so as to indicate the configuration of the constructed element group. In this case, for example, the inventory management module 98 cancels the setting of the planned attribute regarding the planned data. In this manner, the inventory data, which has played a role of the planned data, has the role shifted from the role of the planned data to a role of the inventory data indicating the current status of the configuration of the element group actually constructed in the communication system 1 and the current status of the link between the elements.

[Monitoring]

In this case, the monitoring executed by the monitoring management module 102 is further described.

As described above, in this embodiment, the inventory data stored in the inventory database 110 and the active inventory 114 indicates the current status of the configuration of the element group included in the communication system 1 and the current status of the link between the elements included in the communication system 1.

Further, as described above, the monitoring management module 102 acquires metric data indicating the metric measured by an element from the element included in the communication system 1.

Then, in this embodiment, the monitoring management module 102 executes the monitoring script included in the monitoring script data stored in the monitoring management module 102, to thereby calculate a desired performance index value such as the KPI of a specific type of element (for example, slice, NS, or NF) based on the acquired metric data.

In addition, in this embodiment, as described above, the monitoring script data includes the calculation logic data. In this embodiment, a part of the calculation logic indicated by the calculation logic data is a parameter (variable), and this parameter is substituted by a value determined based on the inventory data.

Now, as a first example, consideration is given to a case in which the calculation logic data indicates a calculation logic for calculating, for a specific type of NS (for example, gNB), an average value of the availability of all NFs (parameter x1) under the control of the NS as the availability of the NS.

In this case, it is assumed that the monitoring management module 102 has acquired, for every NF, the metric data indicating the availability of the NF.

In this case, the monitoring management module 102 refers to the inventory data to identify one or a plurality of NSes of the specific type indicated by the inventory data. In this case, one of the NSes identified in this manner is referred to as "NS of interest." In this case, for example, it is assumed that the gNB 56 has been identified as the NS of interest.

Then, the monitoring management module 102 identifies all the NFs under the control of the NS of interest based on the inventory data. In this case, for example, the monitoring management module 102 identifies the CU-CP 52, the CU-CP 54a, the CU-CP 54b, and the CU-CP 54c as the NEs under the control of the NS of interest based on the topology data illustrated in FIG. 11.

Then, the monitoring management module 102 substitutes one or a plurality of NFs identified in this manner as the value of the parameter x1 of the above-mentioned calculation logic data.

Then, the monitoring management module 102 calculates the value of the availability of the NS of interest in accordance with the calculation logic indicated by the calculation logic data. In this case, for example, the monitoring management module 102 identifies the availability of one or a plurality of NFs set as the value of the parameter x1. Then, the monitoring management module 102 calculates an average value of the identified availability as the value of the availability of the NS of interest.

In this embodiment, for example, the above-mentioned process is executed for all the identified NSes of the specific type.

Now, as a second example, consideration is given to a case in which the calculation logic data indicates a calculation logic for calculating, for a specific type of network slice, an average value of the availability of all NFs (parameter x2) belonging to the network slice as the availability of the network slice.

In this case, it is assumed that the monitoring management module 102 has acquired the metric data indicating the availability of every NF. In this case, it is conceivable that the NF belongs to a plurality of network slices. In this case, the monitoring management module 102 acquires the metric data indicating the availability of every NF for each network slice.

In this case, the monitoring management module 102 refers to the inventory data to identify one or a plurality of network slices of the specific type indicated by the inventory data. In this case, one of the network slices identified in this manner is referred to as "network slice of interest." In this case, for example, it is assumed that the network slice 68b has been identified as the network slice of interest.

Then, the monitoring management module 102 identifies all the NFs belonging to the network slice of interest based on the inventory data. In this case, for example, the monitoring management module 102 identifies the DU 50, the CU-UP 54b, and the UPF 64b as the NEs belonging to the network slice of interest based on the topology data illustrated in FIG. 12.

Then, the monitoring management module 102 substitutes one or a plurality of NFs identified in this manner as the value of the parameter x2 of the above-mentioned calculation logic data.

Then, the monitoring management module 102 calculates the value of the availability of the network slice of interest in accordance with the calculation logic indicated by the calculation logic data. In this case, for example, the monitoring management module 102 identifies the availability of one or a plurality of NFs set as the value of the parameter x2 in regard to the network slice of interest. As illustrated in FIG. 4, the DU 50, the CU-UP 54b, and the UPF 64b all belong to a plurality of network slices, but in this case, the availability regarding the network slice 68b is identified. Then, the monitoring management module 102 calculates an average value of the identified availability as the value of the availability of the network slice of interest.

In this embodiment, for example, the above-mentioned process is executed for all the identified network slices of the specific type.

In the second example, the monitoring management module 102 may identify all the NSes belonging to the network slice for each network slice of interest. For example, the NSes corresponding to the node 130j and the node 130k may be identified.

Then, the monitoring management module 102 may identify, for each of the identified NSes, all the NFs belonging to the network slice under the control of the NS. In this case, for example, the NFs corresponding to the node 130l and the node 130m may be identified as the NFs under the control of the node 130j. Meanwhile, the NF corresponding to the node 130n may be identified as the NF under the control of the node 130k.

Then, the monitoring management module 102 may calculate, for each of the identified NSes, an average value of the availability of all the NFs belonging to the network slice under the control of the NS in regard to the network slice of interest as the value of the availability of the NS. For example, an average value of the availability of the NFs respectively corresponding to the node 130l and the node 130m in regard to the network slice corresponding to the node 130i may be calculated as the value of the availability of the NS corresponding to the node 130j in regard to the network slice corresponding to the node 130i. Meanwhile, the value of the availability of the NF corresponding to the node 130n in regard to the network slice corresponding to the node 130i may be calculated as the value of the availability of the NS corresponding to the node 130k in regard to the network slice corresponding to the node 130i.

Then, the monitoring management module 102 may calculate an average value of the values of the availability calculated for the respective NSes as the value of the availability of the network slice of interest. For example, an average value of the value of the availability of the NS corresponding to the node 130j in regard to the network slice corresponding to the node 130i and the value of the availability of the NS corresponding to the node 130k in regard to the network slice corresponding to the node 130i may be calculated as the value of the availability of the network slice corresponding to the node 130*i*.

In this case, for example, the calculation logic data may indicate a calculation logic for calculating a weighted average value of the values of the availability calculated for the respective NSes as the value of the availability of the network slice.

Then, the monitoring management module 102 may calculate the weighted average value of the values of the availability calculated for the respective NSes as the value of the availability of the network slice.

For example, the calculation logic data may indicate a calculation logic for calculating "(p1×99+p2)/100" as the availability of the network slice. In this case, p1 represents the average value of the availability of the NFs included in the RAN 38, and p2 represents the average value of the availability of the NEs included in the core network system 40.

Then, in this case, the monitoring management module 102 may calculate the value of the availability of the network slice of interest by applying the above-mentioned calculation logic. For example, the value of the availability of the NS corresponding to the node 130*j* in regard to the network slice corresponding to the node 130*i* is represented by p1, and the value of the availability of the NS corresponding to the node 130*k* in regard to the network slice corresponding to the node 130*i* is represented by p2. In this case, the value calculated by the mathematical expression "(p1×99+p2)/100" may be calculated as the value of the availability of the network slice corresponding to the node 130*i*.

In this embodiment, as described above, the NOS 32 may store the inventory data indicating the current status of the link between the elements included in the communication system 1.

Then, the NOS 32 may store a calculation logic data indicating a calculation logic for calculating the performance index value of a specific type of element based on the performance index value of the element group linked to the element. The calculation logic data may indicate a calculation logic for calculating the performance index value of a specific type of element based on the performance index value of the element group of the child of the element. As described in the first example, the calculation logic data may also indicate a calculation logic for calculating the performance index value of a specific type of NS based on the performance index value of an NF group under the control of the NS. As described in the second example, the calculation logic data may also indicate a calculation logic for calculating the performance index value of a specific type of network slice based on the performance index value of an NF group belonging to the network slice.

Then, the monitoring management module 102 may identify the above-mentioned specific type of element included in the communication system 1 based on the inventory data and the calculation logic data. For example, as described in the first example, the monitoring management module 102 may identify a specific type of NS included in the communication system 1 based on the inventory data and the calculation logic data. As described in the second example, the monitoring management module 102 may also identify a specific type of network slice included in the communication system 1 based on the inventory data and the calculation logic data.

Then, the monitoring management module 102 may identify the performance index value of each of the plurality of elements included in the element group linked to the identified specific type of element. For example, as described in the first example, the monitoring management module 102 may identify the performance index value of each of the plurality of NEs included in an NF group under the control of the identified specific type of NS. As described in the second example, the monitoring management module 102 may also identify the performance index value of each of the plurality of NFs included in an NF group belonging to the identified specific type of network slice in regard to the network slice.

Then, the monitoring management module 102 may calculate the performance index value of a specific type of element by applying the calculation logic indicated by the calculation logic data to the performance index value identified for each of the plurality of elements. For example, as described in the first example, the monitoring management module 102 may calculate the performance index value of a specific type of NS by applying the calculation logic indicated by the calculation logic data to the performance index value identified for each of the plurality of NFs. As described in the second example, the monitoring management module 102 may also calculate the performance index value of a specific type of network slice by applying the calculation logic indicated by the calculation logic data to the performance index value identified for each of the plurality of NFs. In this case, the type of the performance index represented by the performance index value identified for each of the plurality of elements and the type of the performance index represented by the performance index value calculated by applying the calculation logic indicated by the calculation logic data to the performance index value may be the same or different from each other.

Further, in this embodiment, as described above, the NOS 32 may store the inventory data indicating the current status of the configuration of the element group included in the communication system 1.

The NOS 32 may also store the calculation logic data indicating a condition to be satisfied by an element used for calculating the desired performance index value, a monitoring item for the element, and a calculation logic for calculating the desired performance index value.

For example, in regard to the calculation logic data described in the first example, the condition that the NF is under the control of a specific type of NS corresponds to the "condition to be satisfied by an element used for calculating the desired performance index value." The availability of the NF corresponds to the "monitoring item for the element." The calculation logic for calculating the average value of the availability of all the NFs under the control of the NS as the availability of the NS corresponds to the "calculation logic for calculating the desired performance index value."

Meanwhile, in regard to the calculation logic data described in the second example, the condition that the NF belongs to a specific type of network slice corresponds to the "condition to be satisfied by an element used for calculating the desired performance index value." The availability of the NF in regard to the network slice corresponds to the "monitoring item for the element." The calculation logic for calculating the average value of the availability of all the NEs belonging to the network slice as the availability of the network slice corresponds to the "calculation logic for calculating the desired performance index value."

Then, the monitoring management module 102 may identify an element that satisfies the above-mentioned condition from the element group indicated by the inventory data based on the inventory data and the calculation logic data.

Then, the monitoring management module 102 may calculate a desired performance index value by applying the calculation logic indicated by the calculation logic data to the performance index value of the above-mentioned monitoring item for the identified element.

The element for which the calculation logic for calculating the performance index value is indicated by the calculation logic data is not limited to the network slice (NSI) or the network service (NS). For example, a calculation logic for calculating the performance index value of the NSSI or the NF may be indicated. For example, the calculation logic data may indicate a calculation logic for calculating a total value of throughputs of all the CNFCs under the control of a specific type of NF as a throughput of the NF. In this case, a condition that the CNFCs are under the control of the NF corresponds to the above-mentioned "condition to be satisfied by an element used for calculating the desired performance index value." In addition, the throughput corresponds to the above-mentioned "monitoring item for the element."

In this embodiment, for example, the monitoring management module 102 also notifies the E2EO module 96 of the value of the KPI calculated as described above. Then, the E2EO module 96 executes the workflow script associated with the condition when a predetermined condition that, for example, the value of the KPI exceeds a threshold value defined in advance or the value of the KPI is smaller than a threshold value defined in advance, is satisfied. In this manner, for example, scale-out corresponding to the condition is executed. In this embodiment, the scale-out that cannot be handled by Kubernetes of the container management module 106 can be executed. The information of the threshold value may be included in technology service catalog data of a bundle file. As described above, the information of the threshold value may also be included in the service catalog data.

In the scale-out, the same process as a process performed when a new element is constructed is executed. For example, the inventory management module 98 updates the inventory data stored in the active inventory 114 and the inventory database 110 so as to conform to changes in current statuses of the configuration of the element group and the link between the elements due to the scale-out.

Figure 13:
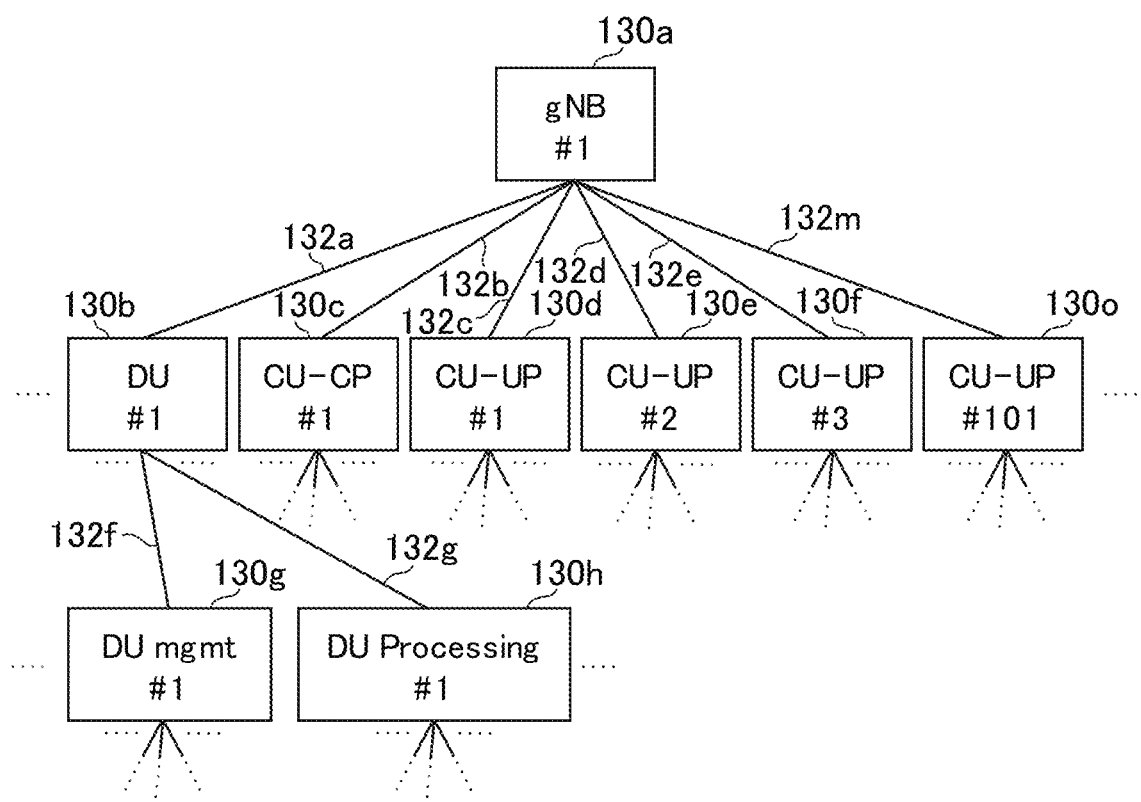
FIG. 13 is a diagram for schematically illustrating an example of the topology data.

For example, it is assumed that the scale-out has been executed, to thereby add the CU-UP 54 under the control of the gNB 56 and update the topology data illustrated in FIG. 11 to topology data illustrated in FIG. 13. In the topology data illustrated in FIG. 13, a node 130o having an identifier of "CU-UP #101" has been added. In addition, a link 132m connecting the node 130a and the node 130o to each other has been added.

Figure 14:
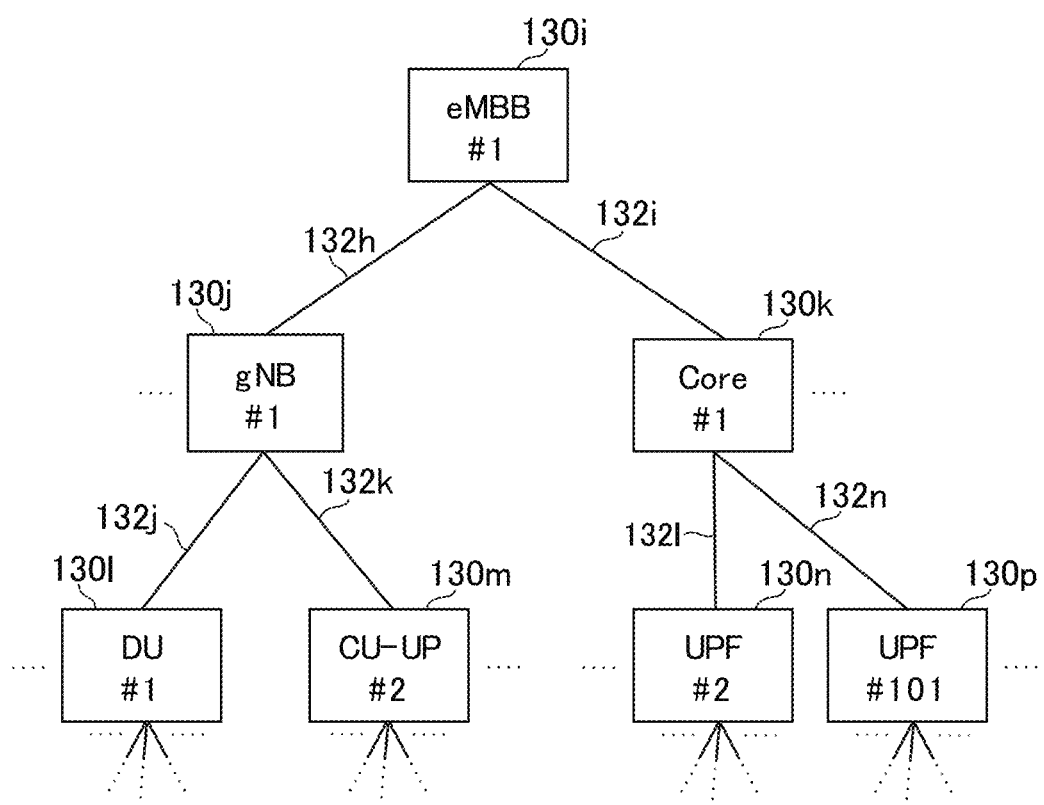
FIG. 14 is a diagram for schematically illustrating an example of the topology data.

Further, for example, it is assumed that the scale-out has been executed, to thereby add the UPF 64 belonging to the network slice 68b and update the topology data illustrated in FIG. 12 to topology data illustrated in FIG. 14. In the topology data illustrated in FIG. 14, a node 130p having an identifier of "UPF #101" has been added. In addition, a link 132n connecting the node 130k and the node 130p to each other has been added.

Even when such a topology change as described above occurs, in this embodiment, only the value substituted into the parameter of the above-mentioned calculation logic data is changed, and it is not required to change the calculation logic itself indicated by the calculation logic data.

For example, the values substituted as the value of the above-mentioned parameter x1 are only changed from the NFs corresponding to the node 130b, the node 130c, the node 130d, the node 130e, and the node 130f to the NFs corresponding to the node 130b, the node 130c, the node 130d, the node 130e, the node 130f, and the node 130o. Further, the values substituted as the value of the above-mentioned parameter x2 are only changed from the NFs corresponding to the node 130l, the node 130m, and the node 130n to the NFs corresponding to the node 130l, the node 130m, the node 130n, and the node 130p.

Accordingly, it is not required to change monitoring settings, for example, change targets to be aggregated, each time there is a change in current status of the link between elements, such as addition or deletion of a functional unit under the control of the network service. In addition, it is not required to set the calculation logic for calculating the performance index value to be monitored in accordance with the current status of a constructed functional block group.

In this manner, according to this embodiment, it is possible to reduce time and labor required in the operation of the communication system 1.

The topology change in this embodiment is not limited to the scale-out. For example, scale-in or relocation (replacement) may be handled as the topology change in this embodiment.

Further, it is assumed that an NF belonging to a specific network slice has been added by the scale-out in this embodiment. In this case, an NF added in this manner is not only added to an element substituted into the parameter in the calculation of the desired performance index value for an NS having the NF under the control thereof but also added to an element substituted into the parameter in the calculation of the desired performance index value for a network slice to which the NF belongs. That is, the addition of such an NF affects both the calculation of the desired performance index value for the NS having the NF under the control thereof and the calculation of the desired performance index value for the network slice to which the NE belongs.

[Execution of Action]

Now, an example of execution of an action such as the execution of the workflow script by the E2EO module 96 is further described.

Figure 15:
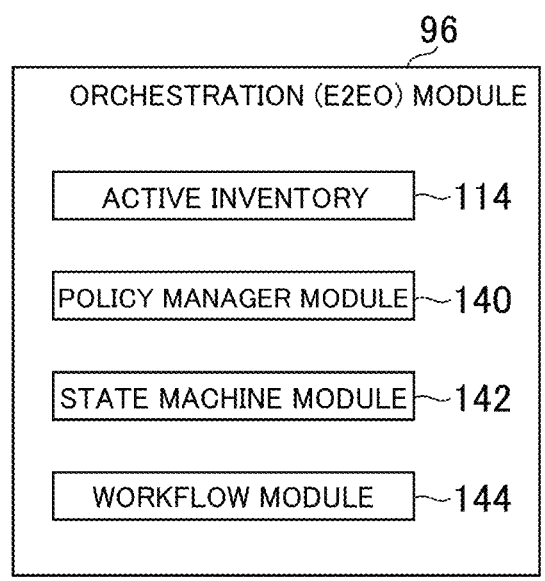
FIG. 15 is a diagram for illustrating an example of a configuration of an E2EO module.

FIG. 15 is a diagram for illustrating an example of a configuration of the E2EO module 96. As illustrated in FIG. 15, the E2EO module 96 includes a policy manager module 140, a state machine module 142, and a workflow module 144 in addition to the above-mentioned active inventory 114.

The policy manager module 140 receives a notification of the performance index value such as the value of the KPI described above from the monitoring management module 102. As described above, the performance index value is calculated by the monitoring management module 102 based on, for example, the metric data acquired by the monitoring management module 102. Then, the policy manager module 140 holds the data indicating the performance index value indicated by the received notification.

Further, in embodiment, this when the monitoring management module 102 receives a notification of an alert from each of the elements (software elements) such as the network slice, the NS, the NF, and the CNFC that are included in the communication system 1 and the hardware, for example, the server 120 in such a manner as described above, the monitoring management module 102 transmits the notification to the policy manager module 140. Then, the policy manager module 140 receives the notification of the alert transmitted from the monitoring management module 102. Then, the policy manager module 140 holds the data indicating the notification of the alert.

The state machine module 142 stores a state machine associated with an element included in the communication system 1. The state machine manages a state of the element associated with the state machine.

The workflow module 144 stores the above-mentioned workflow script.

The policy manager module 140 determines, for example, to execute an action such as scale-out on a specific element included in the communication system 1 based on a performance index value or an alert received from the monitoring management module 102. Then, the policy manager module 140 outputs an execution instruction for an action to the state machine corresponding to an element on which the execution of the action has been determined. Then, the state machine starts to execute the workflow associated with the action on the element.

As described above, the inventory data in this embodiment may indicate the current statuses of the links between the elements included in the communication system 1. The inventory data may also indicate the current statuses of the software elements included in the communication system 1 and the hardware on which the software element is operating.

Then, in this embodiment, the policy manager module 140 stores action data indicating actions, for example, healing, scale-out, and relocation (replacement) to be executed on the elements included in the communication system 1. This action data may be, for example, an identifier (ID) of the above-mentioned workflow.

Then, it is assumed that the action data described below is linked to condition data indicating a condition relating to the operation status of a specific type of element.

Then, in this embodiment, for example, the policy manager module 140 identifies a current operation status (for example, the above-mentioned performance index value or the status indicated by the received alert) of the specific type of element included in the communication system 1.

Then, when the operation status identified for the specific type of element satisfies the condition linked to the action data, the policy manager module 140 instructs the state machine associated with the specific type of element to execute an action indicated by the action data on the specific type of element. Then, the state machine executes the action.

Examples of the condition indicated by the condition data linked to the action data indicating the scale-out of a specific type of NS include "the availability of gNB is equal to or smaller than a predetermined value." In this case, for example, when the policy manager module 140 identifies that the availability of the gNB 56 illustrated in FIG. 3 is equal to or smaller than the predetermined value, the scale-out of the gNB 56 is executed.

Further, examples of the condition indicated by the condition data linked to the action data indicating the scale-out of a specific type of NF include "the availability of UPF is equal to or smaller than a predetermined value." In this case, for example, when the policy manager module 140 identifies that the availability of the UPF 64a illustrated in FIG. 3 is equal to or smaller than the predetermined value, the scale-out of the UPF 64a is executed.

Further, examples of the condition indicated by the condition data linked to the action data indicating the scale-out of a specific type of network slice include "the availability of network slice of an eMBB is equal to or smaller than a predetermined value." In this case, for example, when the policy manager module 140 identifies that the availability of the network slice 68b illustrated in FIG. 4 is equal to or smaller than the predetermined value, the scale-out of the network slice 68b is executed.

In this embodiment, the action data may be linked to condition data indicating a condition relating to a combination of the operation status of a specific type of element and the operation status of another type of element linked to the specific type of element. It is indicated in, for example, the inventory data which element is linked to the specific type of element as the another type of element.

Then, the policy manager module 140 may identify, based on the current status indicated by the inventory data, a combination of the current operation status of a specific type of element included in the communication system 1 and the current operation status of another type of element linked to the specific type of element.

Then, when the identified combination satisfies the condition linked to the action data, the E2EO module 96 may execute the action indicated by the action data on the specific type of element. For example, when the identified combination satisfies the condition linked to the action data, the policy manager module 140 may instruct the state machine associated with the element to execute the action indicated by the action data on the specific type of element. Then, the state machine may execute the action.

For example, the action data may be linked to condition data indicating a condition relating to a combination of the operation status of a specific type of network service (NS) and the operation status of each of a plurality of functional units (NF) under the control of the specific type of NS.

Then, the policy manager module 140 may identify, based on the current status indicated by the inventory data, a combination of the current operation status of a specific type of NS included in the communication system 1 and the current operation status of each of a plurality of NEs under the control of the NS.

Then, when the identified combination satisfies the condition linked to the action data, the policy manager module 140 may instruct the state machine associated with the NS to execute the action indicated by the action data on the specific type of NS. Then, the state machine may execute the action.

In this case, examples of the condition indicated by the condition data linked to the action data indicating the relocation (replacement) of a specific type of NS include "the availability of a gNB is smaller than a predetermined value a1 and the availability of all the NFs under the control of the gNB is equal to or larger than a predetermined value a2." It is presumed that this condition is satisfied when hardware on which NFs under the control of an NS are operating has deteriorated on the whole. Accordingly, in general, it is desired that the relocation (replacement) of the NS be executed when this condition is satisfied.

Then, in this case, for example, the policy manager module 140 may identify based on the inventory data that the DU 50, the CU-CP 52, the CU-UP 54a, the CU-UP 54b, and the CU-UP 54c are under the control of the gNB 56 illustrated in FIG. 3. Then, the policy manager module 140 may identify the operation status (for example, value of the availability in this case) of the gNB 56. The policy manager module 140 may also identify the operation status (for example, value of the availability in this case) of each of the DU 50, the CU-CP 52, the CU-UP 54a, the CU-UP 54b, and the CU-UP 54c.

Then, the policy manager module 140 may determine whether or not the value of the availability of the gNB 56 is smaller than the predetermined value a1. In this case, for example, it is assumed that the value of the availability of the gNB 56 is smaller than the predetermined value a1.

In this case, the policy manager module 140 may determine whether or not the values of the availability of the DU 50, the CU-CP 52, the CU-UP 54*a*, the CU-UP 54*b*, and the CU-UP 54*c* are all equal to or larger than the predetermined value a2.

Then, when the values of the availability of the DU 50, the CU-CP 52, the CU-UP 54*a*, the CU-UP 54*b*, and the CU-UP 54*c* are all equal to or larger than the predetermined value a2, the relocation (replacement) of the gNB 56 may be executed. Specifically, for example, the gNB 56 may be executed on another server, or a server on which the gNB 56 is currently operating may be separated from a cluster to which the server belongs.

Then, when at least one of the values of the availability of the DU 50, the CU-CP 52, the CU-UP 54*a*, the CU-UP 54*b*, and the CU-UP 54*c* is smaller than the predetermined value a2, the relocation (replacement) of the gNB 56 may be inhibited from being executed.

Further, for example, the action data may be linked to condition data indicating a condition relating to a combination of the operation status of a specific type of functional unit (NF) and the operation status of a network service (NS) having the specific type of NF under the control thereof.

Then, the policy manager module 140 may identify, based on the current status indicated by the inventory data, a combination of the current operation status of a specific type of NF included in the communication system 1 and the current operation status of the NS having the specific type of NF under the control thereof.

Then, when the identified combination satisfies the condition linked to the action data, the policy manager module 140 may instruct the state machine associated with the NF to execute the action indicated by the action data on the specific type of NF. Then, the state machine may execute the action.

In this case, examples of the condition indicated by the condition data linked to the action data indicating the scale-out of a specific type of NF include "the availability of a CU-CP is smaller than the predetermined value a1 and the availability of a gNB having the CU-CP under the control thereof is equal to or larger than the predetermined value a2."

Then, in this case, for example, the policy manager module 140 may identify based on the inventory data that the gNB 56 illustrated in FIG. 3 has the CU-CP 52 under the control thereof. Then, the policy manager module 140 may identify the operation status (for example, value of the availability in this case) of the CU-CP 52. The policy manager module 140 may also identify the operation status (for example, value of the availability in this case) of the gNB 56.

Then, the policy manager module 140 may determine whether or not the value of the availability of the CU-CP 52 is smaller than the predetermined value a1. In this case, for example, it is assumed that the value of the availability of the CU-CP 52 is smaller than the predetermined value a1.

In this case, the policy manager module 140 may determine whether or not the value of the availability of the gNB 56 is equal to or larger than the predetermined value a2.

Then, when the value of the availability of the gNB 56 is equal to or larger than the predetermined value a2, the scale-out of the CU-CP 52 may be executed.

Meanwhile, when the value of the availability of the gNB 56 is smaller than the predetermined value a2, the scale-out of the CU-CP 52 may be inhibited from being executed.

Further, for example, the action data may be linked to condition data indicating a condition relating to a combination of the operation status of a specific type of network slice and the operation status of each of a plurality of functional units (NFs) belonging to the specific type of network slice.

Then, the policy manager module 140 may identify, based on the current status indicated by the inventory data, a combination of the current operation status of a specific type of network slice included in the communication system 1 and the current operation status of each of a plurality of NFs belonging to the specific type of network slice.

Then, when the identified combination satisfies the condition linked to the action data, the policy manager module 140 may instruct the state machine associated with the network slice to execute the action indicated by the action data on the specific type of network slice. Then, the state machine may execute the action.

In this case, examples of the condition indicated by the condition data linked to the action data indicating the scale-out of a specific type of network slice include "the availability of the network slice of an eMBB is smaller than the predetermined value a1 and the availability of all the plurality of NEs belonging to the specific type of network slice is equal to or larger than the predetermined value a2."

Then, in this case, for example, the policy manager module 140 may identify based on the inventory data that the DU 50, the CU-UP 54*b*, and the UPF 64*b* belong to the network slice 68*b* illustrated in FIG. 4. Then, the policy manager module 140 may identify the operation status (for example, value of the availability in this case) of the network slice 68*b*. The policy manager module 140 may also identify the operation statuses (for example, values of the availability in this case) of the DU 50, the CU-UP 54*b*, and the UPF 64*b*. In this case, for example, the operation statuses (for example, values of the availability in this case) of the DU 50, the CU-UP 54*b*, and the UPF 64*b* in regard to the network slice 68*b* may be identified.

Then, the policy manager module 140 may determine whether or not the value of the availability of the network slice 68*b* is smaller than the predetermined value a1. In this case, for example, it is assumed that the value of the availability of the network slice 68*b* is smaller than the predetermined value a1.

In this case, the policy manager module 140 may determine whether or not the values of the availability of the DU 50, the CU-UP 54*b*, and the UPF 64*b* are all equal to or larger than the predetermined value a2. In this case, for example, it may be determined whether or not the values of the availability of the DU 50, the CU-UP 54*b*, and the UPF 64*b* in regard to the network slice 68*b* are all equal to or larger than the predetermined value a2.

Then, when the values of the availability of the DU 50, the CU-UP 54*b*, and the UPF 64*b* are all equal to or larger than the predetermined value a2, the scale-out of the network slice 68*b* may be executed. In this case, for example, when the values of the availability of the DU 50, the CU-UP 54*b*, and the UPF 64*b* in regard to the network slice 68*b* are all equal to or larger than the predetermined value a2, the scale-out of the network slice 68*b* may be executed.

Meanwhile, when at least one of the values of the availability of the DU 50, the CU-UP 54*b*, and the UPF 64*b* is smaller than the predetermined value a2, the scale-out of the network slice 68*b* may be inhibited from being executed. In this case, for example, when at least one of the values of the availability of the DU 50, the CU-UP 54*b*, and the UPF 64*b* in regard to the network slice 68*b* is smaller than the predetermined value a2, the scale-out of the network slice 68b may be inhibited from being executed.

Further, for example, the action data may be linked to condition data indicating a condition relating to a combination of the operation status of a specific type of functional unit (NF) and the operation status of a network slice to which the specific type of NF belongs.

Then, the policy manager module 140 may identify, based on the current status indicated by the inventory data, a combination of the current operation status of a specific type of NF included in the communication system 1 and the current operation status of the network slice to which the specific type of NF belongs.

Then, when the identified combination satisfies the condition linked to the action data, the policy manager module 140 may instruct the state machine associated with the NF to execute the action indicated by the action data on the specific type of NF. Then, the state machine may execute the action.

In this case, examples of the condition indicated by the condition data linked to the action data indicating the scale-out of a specific type of NF include "the availability of a UPF is smaller than the predetermined value a1 and the availability of the network slice to which the UPF belongs is equal to or larger than the predetermined value a2."

Then, in this case, for example, the policy manager module 140 may identify based on the inventory data that the UPF 64b illustrated in FIG. 4 belongs to the network slice 68b. Then, the policy manager module 140 may identify the operation status (for example, value of the availability in this case) of the UPF 64b. In this case, for example, the operation status (for example, value of the availability in this case) of the UPF 64b in regard to the network slice 68b may be identified. The policy manager module 140 may also identify the operation status (for example, value of the availability in this case) of the network slice 68b.

Then, the policy manager module 140 may determine whether or not the value of the availability of the UPF 64b is smaller than the predetermined value a1. In this case, for example, it may be determined whether or not the value of the availability of the UPF 64b in regard to the network slice 68b is smaller than the predetermined value a1. In this case, for example, it is assumed that the value of the availability of the UPF 64b is smaller than the predetermined value a1.

In this case, the policy manager module 140 may determine whether or not the value of the availability of the network slice 68b is equal to or larger than the predetermined value a2.

Then, when the value of the availability of the network slice 68b is equal to or larger than the predetermined value a2, the scale-out of the UPF 64b may be executed.

Meanwhile, when the value of the availability of the network slice 68b is smaller than the predetermined value a2, the scale-out of the UPF 64b may be inhibited from being executed.

In the embodiment described above, when the combination of the current operation status of a specific type of element and the current operation status of another type of element linked to the specific type of element satisfies the condition linked to the action data, the action indicated by the action data is executed. In this manner, according to this embodiment, it is possible to execute an action corresponding to an overall operation status of the communication system 1.

Further, in this embodiment, the action data may be linked to condition data indicating a condition relating to a combination of the operation status of a specific type of software element and the operation status of the hardware on which the specific type of software element is operating. As described above, the hardware on which a specific type of software element is operating is indicated by the inventory data.

Then, the policy manager module 140 may identify, based on the current status indicated by the inventory data, a combination of the current operation status of a specific type of software element included in the communication system 1 and the current operation status of the hardware on which the specific type of software element is operating.

Then, when the identified combination satisfies the condition linked to the action data, the E2EO module 96 may execute the action indicated by the action data on the specific type of software element. For example, when the identified combination satisfies the condition linked to the action data, the policy manager module 140 may instruct the state machine associated with the software element to execute the action indicated by the action data on the specific type of software element. Then, the state machine may execute the action.

For example, the action data may be linked to condition data indicating a condition relating to a combination of the operation status of a specific type of network service (NS) and the operation status of the hardware on which the specific type of NS is operating (for example, hardware on which a container under the control of the specific type of NS is operating in this case).

Then, the policy manager module 140 may identify, based on the current status indicated by the inventory data, a combination of the current operation status of a specific type of NS included in the communication system 1 and the current operation status of the hardware on which the specific type of NS is operating.

Then, when the identified combination satisfies the condition linked to the action data, the policy manager module 140 may instruct the state machine associated with the NS to execute the action indicated by the action data on the specific type of NS. Then, the state machine may execute the action.

In this case, examples of the condition indicated by the condition data linked to the action data indicating the scale-out of a specific type of NS include "a call success rate of an end-to-end service is the (E2E smaller than service) predetermined value a1 and an average value of a CPU usage rate of the hardware on which the specific type of NS is operating is smaller than the predetermined value a2."

Then, in this case, for example, the policy manager module 140 may identify, based on the inventory data, a server group on which a CNFC under the control of a certain E2E service is operating.

Then, the policy manager module 140 may determine whether or not the value of the call success rate of the E2E service is smaller than the predetermined value a1. In this case, for example, it is assumed that the value of the call success rate is smaller than the predetermined value a1.

In this case, the policy manager module 140 may identify whether or not the average value of the CPU usage rate of the server group on which the CNFC under the control of the E2E service is operating is smaller than the predetermined value a2. When the average value of the CPU usage rate is smaller than the predetermined value a2, the scale-out of the entire E2E service may be executed. Meanwhile, when the average value of the CPU usage rate is equal to or larger than the predetermined value a2, the scale-out of the entire E2E service may be inhibited from being executed.

Further, for example, the action data may be linked to condition data indicating a condition relating to a combination of the operation status of a specific type of functional unit (NF) and the operation status of the hardware on which the specific type of NF is operating (for example, hardware on which a container under the control of the specific type of NF is operating in this case).

Then, the policy manager module 140 may identify, based on the current status indicated by the inventory data, a combination of the current operation status of a specific type of NF included in the communication system 1 and the current operation status of the hardware on which the specific type of NF is operating.

Then, when the identified combination satisfies the condition linked to the action data, the policy manager module 140 may instruct the state machine associated with the NF to execute the action indicated by the action data on the specific type of NF. Then, the state machine may execute the action.

Further, for example, the action data may be linked to condition data indicating a condition relating to a combination of the operation status of a specific type of network slice and the operation status of the hardware on which the functional unit group (NF group) belonging to the specific type of network slice is operating (for example, hardware on which a container under the control of the NF group belonging to the specific type of network slice is operating in this case).

Then, the policy manager module 140 may identify, based on the current status indicated by the inventory data, a combination of the current operation status of a specific type of network slice included in the communication system 1 and the current operation status of the hardware on which the NF group belonging to the specific type of network slice is operating.

Then, when the identified combination satisfies the condition linked to the action data, the policy manager module 140 may instruct the state machine associated with the network slice to execute the action indicated by the action data on the specific type of network slice. Then, the state machine may execute the action.

Further, for example, the action data may be linked to condition data indicating a condition relating to a combination of the operation status of a specific type of software element, the operation status of a software element under the control of the specific type of software element, and the operation status of the hardware on which the specific type of software element is operating.

Then, the policy manager module 140 may identify, based on the current status indicated by the inventory data, a combination of the current operation status of a specific type of software element included in the communication system 1, the current operation status of a software element under the control of the specific type of software element, and the current operation status of the hardware on which the specific type of software element is operating.

Then, when the identified combination satisfies the condition linked to the action data, the policy manager module 140 may instruct the state machine associated with the software element to execute the action indicated by the action data on the specific type of software element. Then, the state machine may execute the action.

In this case, examples of the condition indicated by the condition data linked to the action data indicating the relocation (replacement) of a specific type of NF include "the availability of an AMF is smaller than the predetermined value a1, the availability of all the CNFCs under the control of the AMF is equal to or larger than the predetermined value a2, and a notification of a predetermined type of alert has not been received from servers on which those CNFCs are operating." It is presumed that this condition is satisfied when a failure has occurred in an NIC of one of the servers on which those CNFCs are operating. Accordingly, in general, it is desired that the relocation (replacement) of the specific type of NF be executed when this condition is satisfied.

Then, in this case, for example, the policy manager module 140 may identify, based on the inventory data, a plurality of CNFCs under the control of the AMF 60 illustrated in FIG. 3. The policy manager module 140 may also identify, based on the inventory data, servers on which those CNFCs are operating.

Then, the policy manager module 140 may identify the operation status (for example, value of the availability in this case) of the AMF 60. The policy manager module 140 may also identify the operation status (for example, value of the availability in this case) of each of the plurality of CNFCs under the control of the AMF 60.

Then, the policy manager module 140 may determine whether or not the value of the availability of the AMF 60 is smaller than the predetermined value a1. In this case, for example, it is assumed that the value of the availability of the AMF 60 is smaller than the predetermined value a1.

In this case, the policy manager module 140 may determine whether or not the values of the availability of the respective plurality of CNFCs under the control of the AMF 60 are all equal to or larger than the predetermined value a2. In this case, for example, it is assumed that the values of the availability of those respective plurality of CNFCs are all equal to or larger than the predetermined value a2.

In this case, the policy manager module 140 may examine whether or not a notification of the predetermined type of alert has been received from the servers on which those plurality of CNFCs are operating. In this case, when a notification of the predetermined type of alert has not been received, the relocation (replacement) of the AMF 60 may be executed. Specifically, for example, the AMF 60 may be executed on another server, or a server on which the AMF 60 is currently operating may be separated from a cluster to which the server belongs.

Meanwhile, when a notification of the predetermined type of alert has already been received, the relocation (replacement) of the AMF 60 may be inhibited from being executed.

In the embodiment described above, when the combination of the operation status of a specific type of software element and the operation status of the hardware on which the specific type of software element is operating satisfies the condition linked to the action data, the action indicated by the action data is executed. In this manner, according to this embodiment, it is possible to execute an action corresponding to the overall operation status of the communication system 1.

Further, in this embodiment, even when the policy manager module 140 receives a notification of an alert indicating a predetermined abnormality from a server, in a case in which there is no software element operating on the server, any action may be inhibited from being executed.

As described above, in this embodiment, the condition indicated by the condition data may be the performance index value (for example, availability). The condition indicated by the condition data may also be a condition relating to an event that occurs in an element, for example, the reception of a notification of an alert corresponding to a predetermined event from the monitoring management module 102.

That is, the condition indicated by the condition data may be a condition relating to a combination of the performance index value of a specific type of element or an event that occurs in the specific type of element, and, the performance index value of another type of element linked to the specific type of element or an event that occurs in the another type of element. The condition indicated by the condition data may also be a combination of the performance index value of a specific type of software element or an event that occurs in the specific type of software element, and, the performance index value of the hardware on which the software element is operating or an event that occurs in the hardware.

Further, the specific type of element (software element) described above is not particularly limited. Examples of the specific type of element (software element) include the NS, the NF, the CNFC, the pod, the container, the network slice (NSI), and the network slice subnet instance (NSSI).

[Execution of Action Involving Identification of Cause of Event]

Now, examples of identification of a cause of a detected event and execution of an action corresponding to the identification of the cause, which are performed by the E2EO module 96, are further described.

In this embodiment, when a failure or another event occurs in a certain element included in the communication system 1, a problem sometimes fails to be solved irrespective of countermeasures for the element, which includes healing.

For example, when a root cause of an event that has occurred in the RAN 38 resides in the core network system 40 that includes this RAN 38 in an influence range of the core network system 40, the problem is not solved even by performing the healing on this RAN 38, and there is even a fear in that a multi-failure may rather be caused.

Accordingly, in order to execute appropriate healing, it is required to accurately identify the cause of an event that has occurred in the communication system 1.

In consideration of this, in this embodiment, in such a manner as described below, the cause of an event that has occurred in the communication system 1 may be enabled to be accurately identified.

In this embodiment, the inventory data may indicate the current status of the influence relationship between the elements included in the communication system 1 (for example, geographical relationship or topological relationship between the elements).

As illustrated in FIG. 11 to FIG. 14, it can be said that the above-mentioned inventory data indicates the current status of the topological relationship between the elements.

The above-mentioned inventory data also includes location data indicating locations at which the elements included in the communication system 1 are operating. It can be said therefrom that the above-mentioned inventory data indicates the current status of the geographical relationship between the elements (for example, geographical closeness between the elements).

Further, as described above, the policy manager module 140 in this embodiment stores the action data indicating actions to be executed on the elements included in the communication system 1.

It is also assumed that the action data described below is linked to event type data indicating a type of an event.

The policy manager module 140 in this embodiment may identify, based on the inventory data, the influence relationship (for example, geographical closeness or topological closeness) between the elements included in the communication system 1.

The policy manager module 140 in this embodiment may also detect the occurrence of an event in a specific element included in the communication system 1. For example, in response to a confirmation that the performance index value relating to the specific element is larger than a predetermined threshold value or the performance index value relating to the specific element is smaller than a predetermined threshold value, which has been received from the monitoring management module 102, the policy manager module 140 may detect the occurrence of the event corresponding to this fact in the specific element. In another case, the policy manager module 140 may detect, in response to the reception of the notification of an alert relating to a certain element, the occurrence of an event corresponding to the alert in the element. The element for which the occurrence of an event has been detected in this manner is hereinafter referred to as "event occurrence element."

Then, the policy manager module 140 may identify, based on the inventory data, at least one other element having an influence relationship with the event occurrence element. The other element having an influence relationship with the event occurrence element identified in this manner is hereinafter referred to as "influence element."

In this case, for example, the policy manager module 140 may identify at least one influence element relating to the event occurrence element based on the geographical closeness or the topological closeness between each of the elements included in the communication system 1 and the event occurrence element, which is indicated by the inventory data.

Specifically, for example, a server or data center at a location away from the location of a server or data center on which the event occurrence element is operating by a predetermined distance or shorter may be identified. Then, the element operating on the identified server or data center may be identified as the influence element relating to the event occurrence element.

In another case, an element belonging to the same network slice as that of the event occurrence element may be identified as the influence element relating to the event occurrence element. In another case, a parent element having the event occurrence element under the control thereof or a plurality of elements under the control of the parent element may be identified as the influence elements relating to the event occurrence element.

For example, it is assumed that the occurrence of an event in the RAN 38 has been detected. In this case, the policy manager module 140 may identify, as the influence element relating to the RAN 38, the core network system 40 having an influence relationship with the RAN 38 being the event occurrence element.

In this case, for example, the policy manager module 140 may identify, as the influence element relating to the RAN 38, the core network system 40 belonging to the same network slice as that of the RAN 38.

Further, for example, the policy manager module 140 may identify, as the influence element relating to the RAN 38, the core network system 40 geographically or topologically closest to the RAN 38 from among a plurality of core network systems 40 included in the communication system 1. For example, the core network system 40 present at the location closest to the RAN 38 may be identified as the influence element relating to the RAN 38. Further, for example, the core network system 40 having the smallest number of nodes between the core network system 40 and the RAN 38 indicated by the topology data may be identified as the influence element relating to the RAN 38.

Then, the policy manager module 140 may identify the cause of the event (for example, element being the cause of the event) based on a status of at least one influence element relating to the event occurrence element. The element identified as the cause of the event is hereinafter referred to as "causative element."

Figure 16:
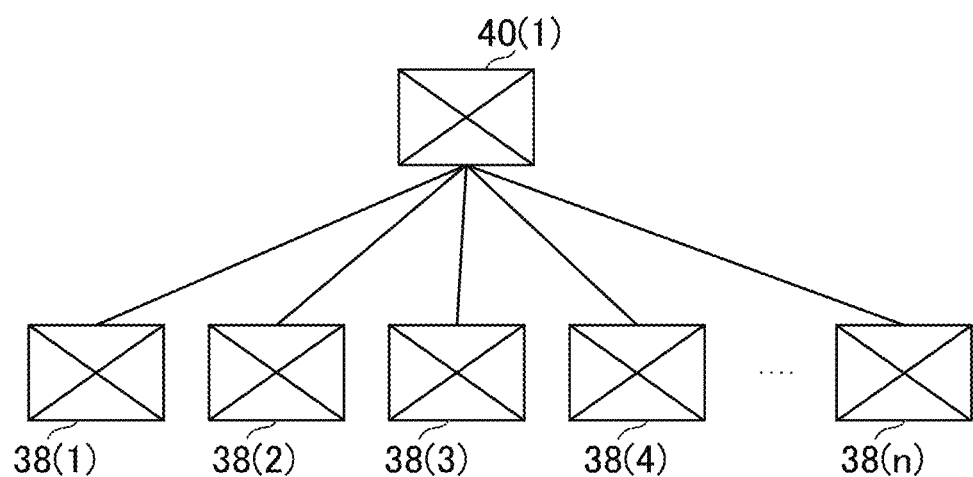
FIG. 16 is a diagram for schematically illustrating an example of an event occurrence situation.
Figure 17:
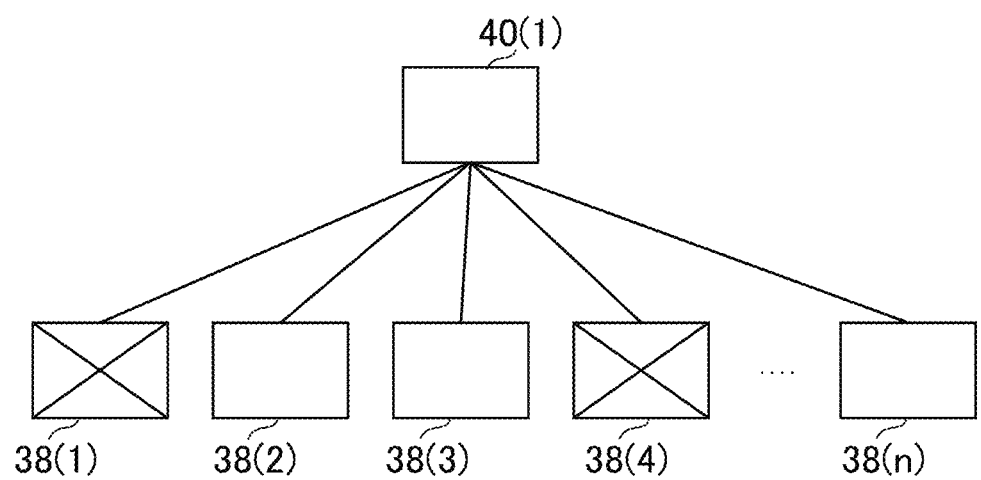
FIG. 17 is a diagram for schematically illustrating an example of the event occurrence situation.

FIG. 16 and FIG. 17 are diagrams for schematically illustrating an example of an event occurrence situation. For example, it is assumed in both FIG. 16 and FIG. 17 that the RAN 38(1) has been detected as the event occurrence element (for example, element in which a failure occurrence event has occurred in this case).

Then, as illustrated in FIG. 16 and FIG. 17, it is assumed that the core network system 40(1) and the RAN 38(2) to the RAN 38(n) are identified as the influence elements for RAN 38(1). In this case, the policy manager module 140 identifies the status of each of the influence elements. In this case, for example, it is identified whether or not a failure has occurred.

Then, the policy manager module 140 identifies any one of the RAN 38(1) or the core network system 40(1) as the causative element based on whether or not those influence elements satisfy a predetermined condition.

For example, as illustrated in FIG. 16, it is assumed that it has been confirmed that a failure has occurred in all the influence elements (for example, core network system 40(1) and RAN 38(2) to RAN 38(n) in this case). In this case, the core network system 40(1) is identified as the causative element.

Otherwise, the RAN 38(1) is identified as the causative element. For example, as illustrated in FIG. 17, when it is confirmed that a failure has occurred only in the RAN 38(4) among the influence elements, the RAN 38(1) is identified as the causative element. In this case, the RAN 38(1) and the RAN 38(4) may be identified as the causative elements.

For example, as described above, the policy manager module 140 may identify whether the cause of the event resides in the core network system 40 or in the RAN 38 based on the statuses of the core network system 40 and all the RANs 38 in the influence range of the core network system 40.

In this case, the policy manager module 140 may identify the cause of the event based on the status of the core network system 40. For example, the policy manager module 140 may identify whether the cause of the event resides in the core network system 40 or in the RAN 38 based on the status of the core network system 40. For example, when it is confirmed that a failure has occurred in the core network system 40, the core network system 40 may be identified as the causative element. Meanwhile, when it is confirmed that no failure has occurred in the core network system 40, the RAN 38 may be identified as the causative element.

Further, in this embodiment, the policy manager module 140 may transmit a predetermined packet for confirmation (for example, ping) to each of at least one influence element. Then, the policy manager module 140 may identify the cause of the event based on whether or not the packet successfully reaches each of at least one influence element. For example, an element that has not been reached by the packet for confirmation may be identified as the causative element.

Further, for example, the packet for confirmation may be transmitted to the influence element in which the occurrence of a failure has been confirmed in such a manner as described above. Then, of the influence elements in which the occurrence of a failure has been confirmed, an influence element that has not been reached by the packet for confirmation may be identified as the causative element.

Then, the E2EO module 96 may execute an action such as the healing corresponding to the event on the causative element identified as described above. In this case, for example, the policy manager module 140 may identify the action data linked to the event type data indicating the type of the event. Then, the policy manager module 140 may output the execution instruction for the action indicated by the identified action data to the state machine corresponding to the identified element. Then, the state machine may start to execute the workflow associated with the action on the element.

For example, in the status illustrated in FIG. 16, even when the healing is executed on the RAN 38(1), the problem is not solved as long as the cause of the event resides in the core network system 40(1). Even in such a case, according to this embodiment, the cause of an event that has occurred in the communication system 1 is accurately identified in such a manner as described above, and hence the problem involved in the occurrence of the event is appropriately solved.

[Flows of Processes]

Figure 18B:
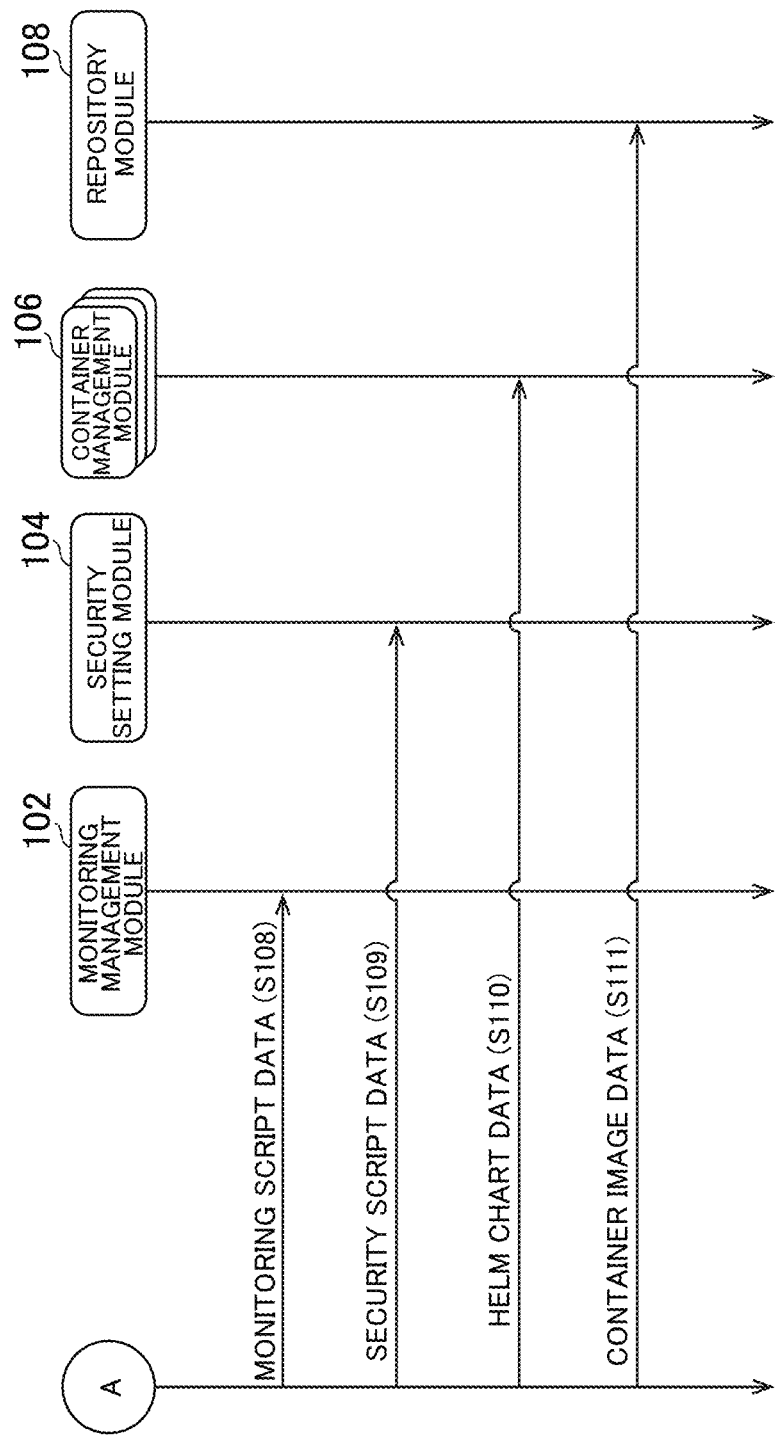
FIG. 18B is a flow chart for illustrating an example of the flow of the processes performed by the vendor terminal, the MPS, and the NOS in the one embodiment of the present invention.

Flows of processes executed by the vendor terminal 36, the MPS 30, and the NOS 32 when the "ONBOARDING" button 70 is clicked by a vendor on the onboarding screen illustrated in FIG. 7 is described with reference to flow charts illustrated in FIG. 18A and FIG. 18B.

First, the vendor terminal 36 transmits bundle data arranged in a path specified on the onboarding screen to the bundle development module 90 of the NOS 32 (Step S101).

Then, the bundle development module 90 develops the bundle data received in the process step of Step S101 and generates a data group illustrated in FIG. 9 (Step S102).

Then, the bundle development module 90 determines a bundle ID corresponding to the data group generated in the process step of Step S102 (Step S103).

The bundle development module 90 then transmits product catalog data included in the data group generated in the process step of Step S102 that is linked to the bundle ID determined in the process step of Step S103 to the product management module 80 of the MPS 30. Then, the product management module 80 of the MPS 30 stores the received product catalog data in the product catalog storage 82 (Step S104).

The bundle development module 90 then outputs to the service management module 92 service catalog data included in the data group generated in the process step of Step S102 that is linked to the bundle ID determined in the process step of Step S103. Then, the service management module 92 stores the received service catalog data in the service catalog storage 94 (Step S105).

The bundle development module 90 stores inventory template data included in the data group generated in the process step of Step S102 that is linked to the bundle ID determined in the process step of Step S103 in the inventory management module 98 (Step S106).

The bundle development module 90 then stores CM template data included in the data group illustrated in Step S102 that is linked to the bundle ID determined in the process step of Step S103 (Step S107).

The bundle development module 90 stores monitoring script data included in the data group generated in the process step of Step S102 that is linked to the bundle ID determined in the process step of Step S103 in the monitoring management module 102 (Step S108).

Then, the bundle development module 90 stores security script data included in the data group generated in the process step of Step S102 that is linked to the bundle ID determined in the process step of Step S103 in the security setting module 104 (Step S109).

The bundle development module 90 then stores Helm chart data included in the data group generated in the process step of Step S102 that is linked to the bundle ID determined in the process step of Step S103 (Step S110) in the container management module 106. For example, the bundle development module 90 may store the Helm chart included in the data group generated in the process step of Step S102 in a plurality of container management modules 106. Further, Helm chart data associated with the container management module 106 may be stored in the container management module 106.

Then, the bundle development module 90 stores container image data included in the data group generated in the process step of S102 that is linked to the bundle ID determined in the process step of Step S103 (Step S111) in the repository module 108, and the process illustrated in this process example is ended.

Figure 19:
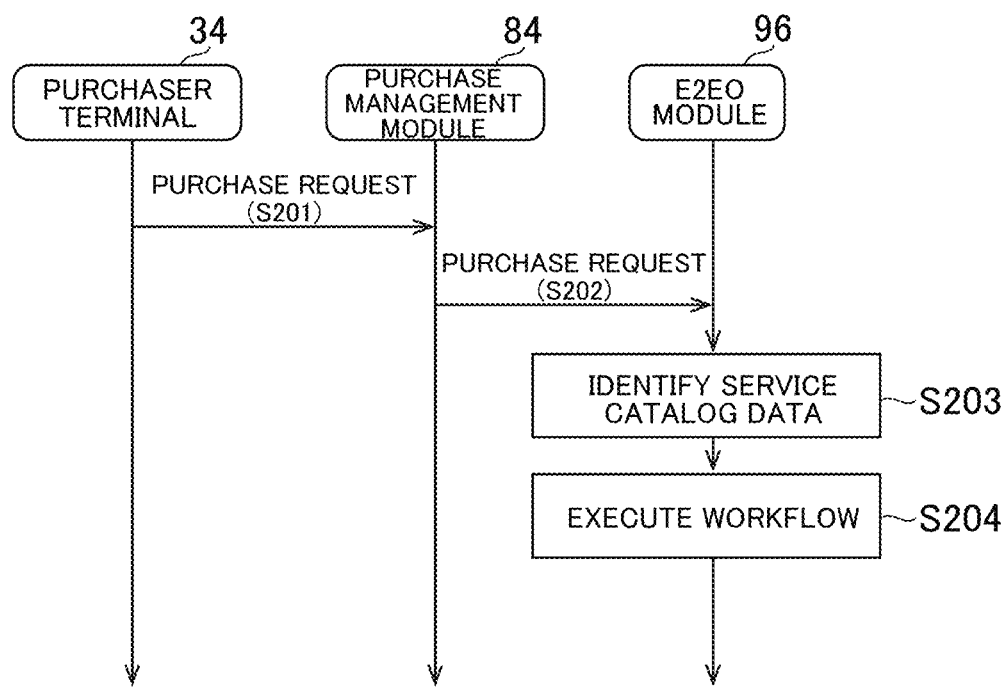
FIG. 19 is a flow chart for illustrating an example of a flow of processes performed by a purchaser terminal, the MPS, and the NOS in the one embodiment of the present invention.
Figure 20B:
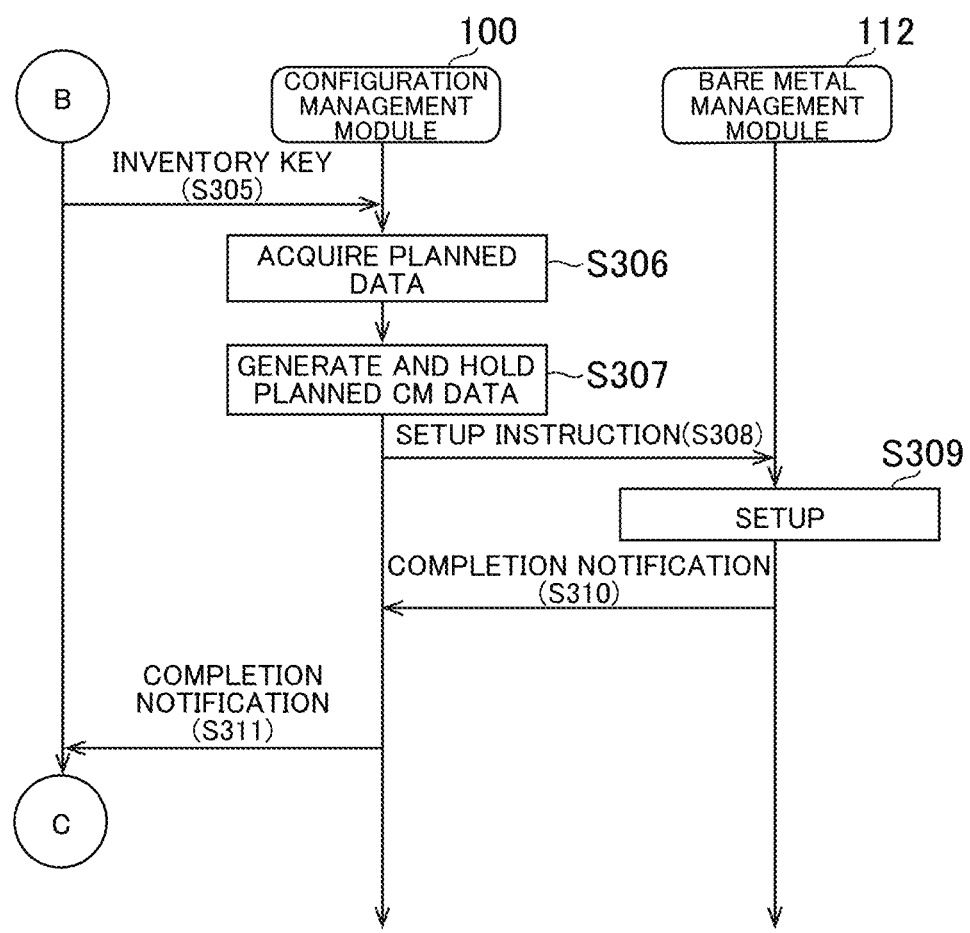
FIG. 20B is a flow chart for illustrating an example of the flow of the processes performed by the NOS in the one embodiment of the present invention.
Figure 20C:
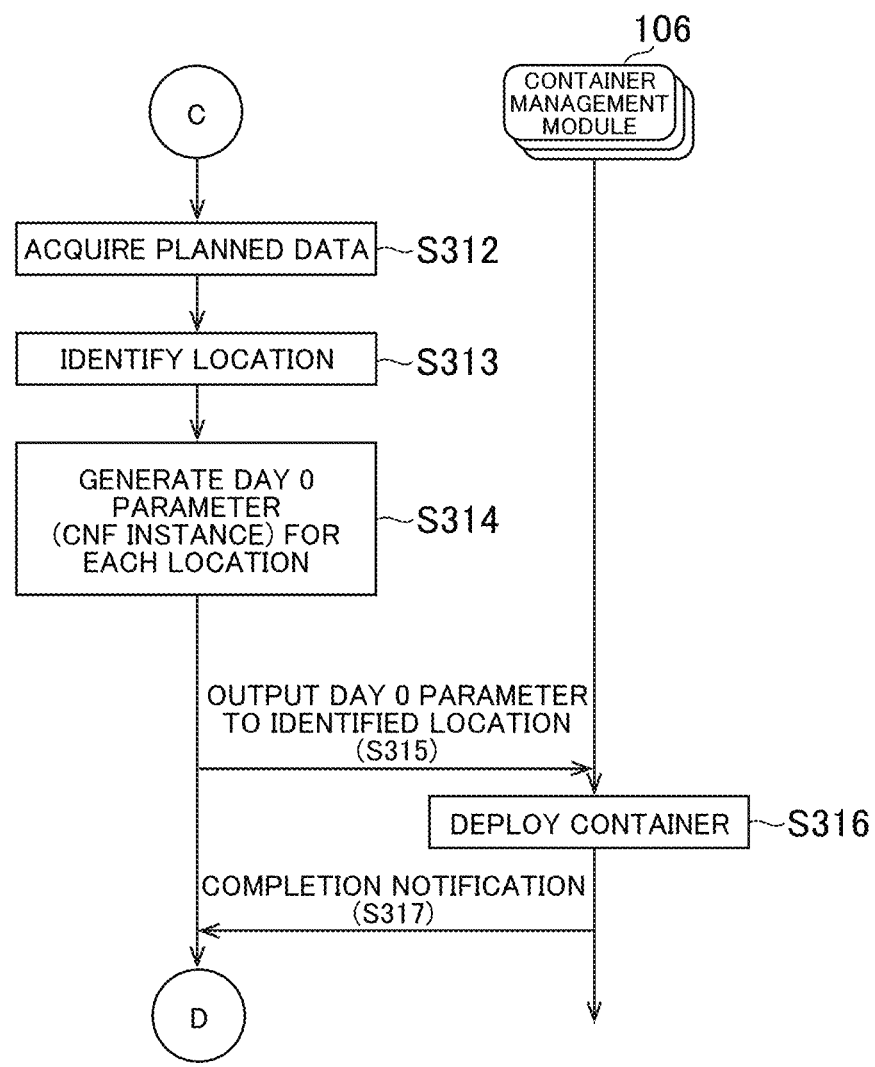
FIG. 20C is a flow chart for illustrating an example of the flow of the processes performed by the NOS in the one embodiment of the present invention.
Figure 20D:
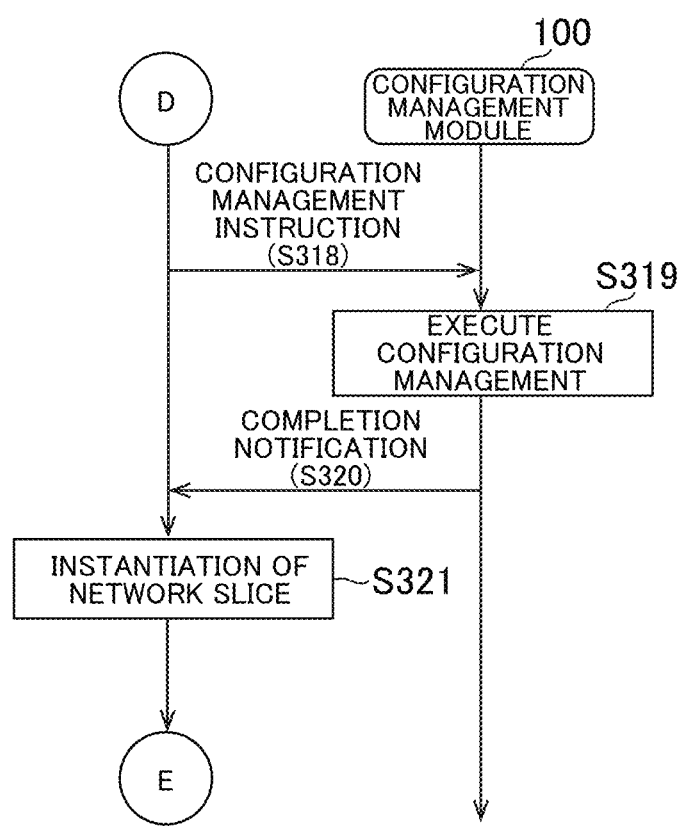
FIG. 20D is a flow chart for illustrating an example of the flow of the processes performed by the NOS in the one embodiment of the present invention.
Figure 20E:
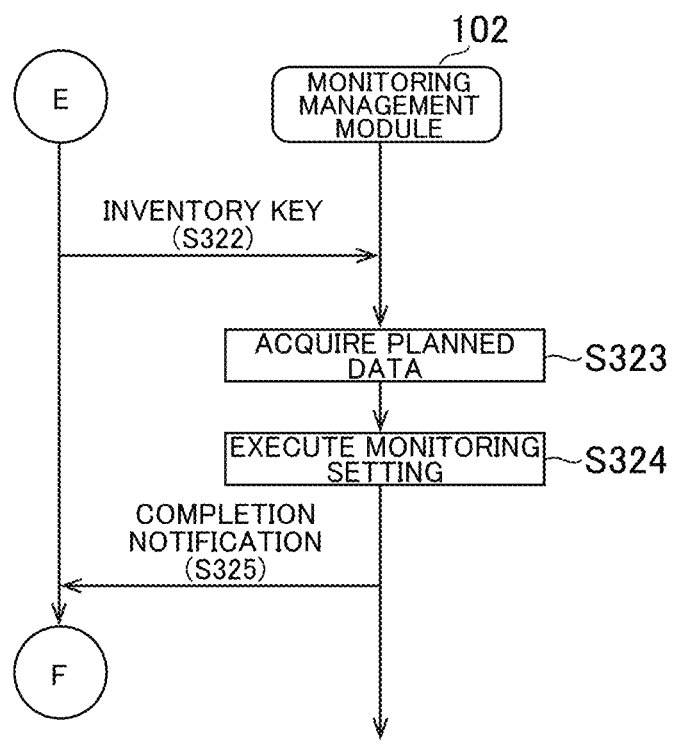
FIG. 20E is a flow chart for illustrating an example of the flow of the processes performed by the NOS in the one embodiment of the present invention.
Figure 20F:
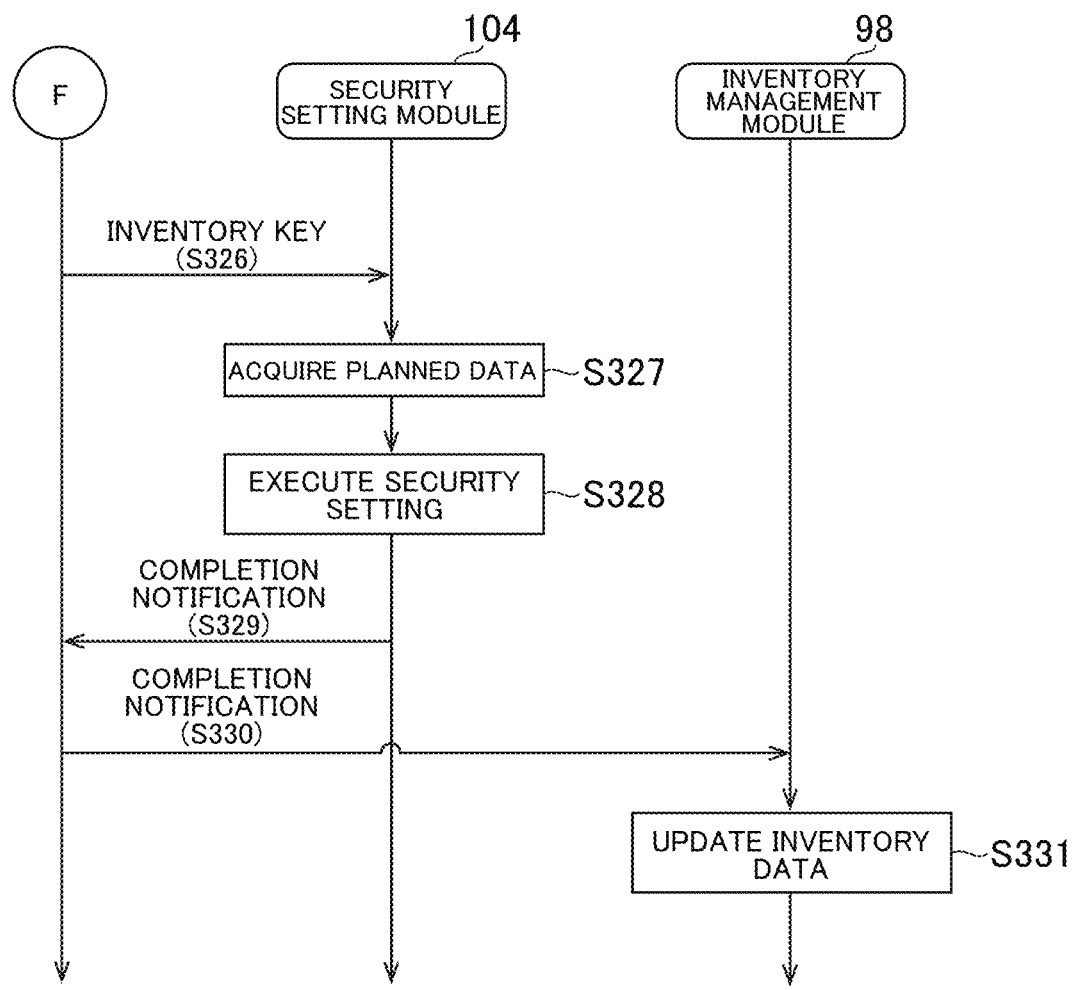
FIG. 20F is a flow chart for illustrating an example of the flow of the processes performed by the NOS in the one embodiment of the present invention.

Next, a flow of processes executed by the purchaser terminal 34, the MPS 30, and the NOS 32 in accordance with a purchase operation of a network service, which is performed by the purchaser, is described with reference to a flow chart illustrated in FIG. 19.

First, the purchaser terminal 34 transmits a purchase request for a network service linked to the purchase bundle ID and the purchase service requirement data to the purchase management module 84 of the MPS 30 (Step S201).

Then, the purchase management module 84 transmits to the E2EO module 96 the purchase request linked to the purchase bundle ID and the purchase service requirement data received in the process step of Step S201 (Step S202).

The E2EO module 96 then identifies service catalog data corresponding to the purchase bundle ID linked to the received purchase request (Step S203).

Then, the E2EO module 96 acquires the service catalog data identified in the process step of Step S203 from the service catalog storage 94 and executes the workflow script indicated by the service catalog data (Step S204), and the process illustrated in this process example is ended.

The details of the process step of Step S204 is now described with reference to flow charts illustrated in FIG. 20A to FIG. 20F.

First, the E2EO module 96 and the inventory management module 98 generate planned data based on the purchase service requirement data linked to the purchase request, service catalog data, inventory template data, and inventory data (Step S301). Then, the inventory management module 98 stores the generated planned data in the active inventory 114 (Step S302). Then, the inventory management module 98 stores the generated planned data in the inventory database 110 (Step S303). The inventory management module 98 then outputs an inventory key included in the generated planned data to the E2EO module 96 (Step S304).

Then, the E2EO module 96 outputs the inventory key that has been received to the configuration management module 100 (Step S305).

The configuration management module 100 then acquires planned data including the received inventory key from the active inventory 114 (Step S306). In this case, the planned data may be acquired from the inventory database 110.

Then, the configuration management module 100 generates and holds planned CM data including a day 1 parameter based on the planned data acquired in the process step of Step S306 (Step S307).

The configuration management module 100 outputs an instruction for a setup, for example, securing required hardware resources, to the bare metal management module 112 (Step S308), and the bare metal management module 112 executes a setup, for example, securing hardware resources in accordance with the instruction (Step S309). At this time, the setup of system software in accordance with a specific type of functional unit and addition of a free server to the resource pool are executed as required.

In this embodiment, a free server may be added to the resource pool with an enough margin (buffer). For example, a plurality of servers 120 may be collectively added to the resource pool.

Then, the bare metal management module 112 outputs a completion notification to the configuration management module 100 (Step S310).

Then, the configuration management module 100 outputs a completion notification to the E2EO module 96 (Step S311).

Then, the E2EO module 96 acquires the planned data including the inventory key received in the process step of Step S304 from the active inventory 114 (Step S312). In this case, the planned data may be acquired from the inventory database 110.

Then, the E2EO module 96 identifies a location at which the element group is deployed based on the planned data acquired in the process step of Step S312 (Step S313).

The E2EO module 96 then generates a day 0 parameter (CNF instance) for each location identified in the process step of Step S313 (Step S314).

Then, to a container management module 106 corresponding to each location identified in the process step of Step S313, the E2EO module 96 outputs a day 0 parameter corresponding to the container management module 106 (Step S315).

The container management module 106 then executes the deployment of a container based on the day 0 parameter that has been received (Step S316).

Then, the container management module 106 outputs the completion notification to the E2EO module 96 (Step S317).

The E2EO module 96 then outputs a configuration management instruction that is based on the day 1 parameter to the configuration management module 100 (Step S318).

Then, the configuration management module 100 executes the configuration management of a container group that is based on the day 1 parameter included in the held planned CM data (Step S319).

The configuration management module 100 then outputs a completion notification to the E2EO module 96 (Step S320).

Then, the E2EO module 96 executes the instantiation of a network slice based on the planned data acquired in the process step of Step S312 (Step S321). In the process step of Step S321, for example, as described above, the E2EO module 96 may output a configuration management instruction related to the instantiation of the network slice to the configuration management module 100. Then, the configuration management module 100 may execute configuration management, for example, settings in accordance with the configuration management instruction.

Further, as described above, the configuration management module 100 may update the day 1 parameter based on the configuration management instruction received from the E2EO module 96 in the process step of Step S321 without executing the process steps of from Step S318 to Step S320. Then, the configuration management module 100 may execute configuration management, for example, settings in accordance with the configuration management instruction.

The E2EO module 96 then outputs the inventory key received in the process step of Step S304 to the monitoring management module 102 (Step S322).

Then, the monitoring management module 102 acquires planned data including the received inventory key from the active inventory 114 (Step S323). In this case, the planned data may be acquired from the inventory database 110.

Based on the planned data acquired in the process step of Step S323, the monitoring management module 102 then executes a monitoring setting in accordance with a monitoring policy indicated by the purchase service requirement data (Step S324).

Then, the monitoring management module 102 outputs a completion notification to the E2EO module 96 (Step S325).

The E2EO module 96 then outputs the inventory key received in the process step of Step S304 to the security setting module 104 (Step S326).

Then, the security setting module 104 acquires planned data including the received inventory key from the active inventory 114 (Step S327). In this case, the planned data may be acquired from the inventory database 110.

The security setting module 104 then executes a security setting based on the planned data acquired in the process step of Step S327 (Step S328).

Then, the security setting module 104 outputs a completion notification to the E2EO module 96 (Step S329).

Then, the E2EO module 96 outputs a completion notification to the inventory management module 98 (Step S330).

Then, the inventory management module 98 updates the inventory data so that the setting of the planned attribute regarding the planned data stored in the active inventory 114 and the inventory database 110 is canceled (Step S331), and the process illustrated in this process example is ended.

Figure 21:
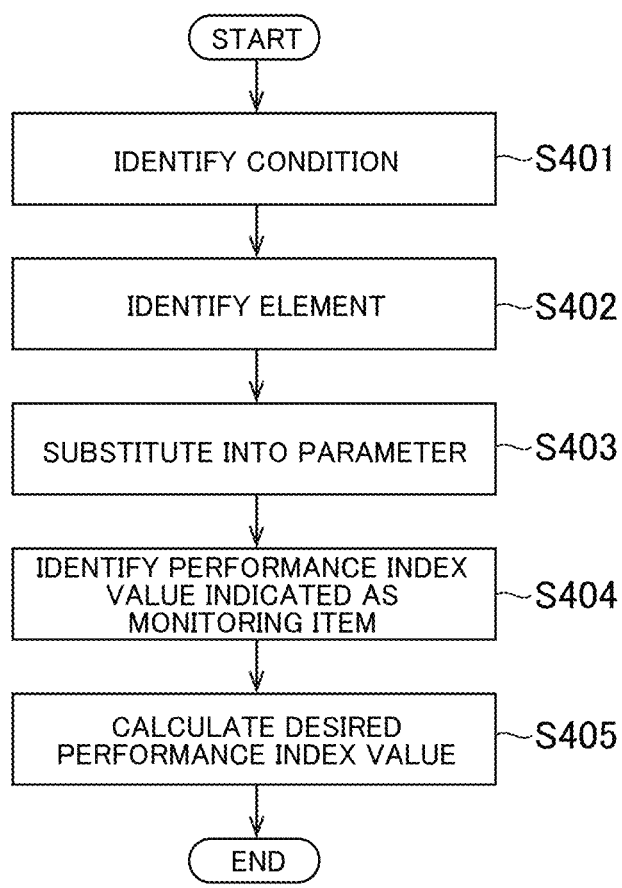
FIG. 21 is a flow chart for illustrating an example of a flow of a process performed by the NOS in the one embodiment of the present invention.

Next, a flow of a process executed by the monitoring management module 102 of the NOS 32 is described with reference to a flow chart illustrated in FIG. 21. FIG. 21 is an illustration of a process for calculating a desired performance index value for one specific element based on one specific piece of calculation logic data.

First, the monitoring management module 102 identifies the condition to be satisfied by an element used for calculating the desired performance index value in the calculation logic data (Step S401).

Then, the monitoring management module 102 searches the inventory data to identify one or a plurality of elements that satisfy the condition identified in the process step of Step S401 (Step S402). In the process step of Step S402, for example, an element corresponding to the node 130 being a child of the node 130 corresponding to the element for which the desired performance index value is to be calculated is identified.

Then, the monitoring management module 102 substitutes the element identified in the process step of Step S402 as the value of the parameter of the calculation logic indicated by the calculation logic data (Step S403).

Then, the monitoring management module 102 identifies the performance index value indicated as the monitoring item for the element in the calculation logic data for the element substituted as the value of the parameter in the process step of Step S403 (Step S404).

Then, the monitoring management module 102 calculates the desired performance index value by applying the calculation logic indicated by the calculation logic data to the performance index value identified in the process step of Step S404 (Step S405), and the process illustrated in this process example is ended.

Figure 22:
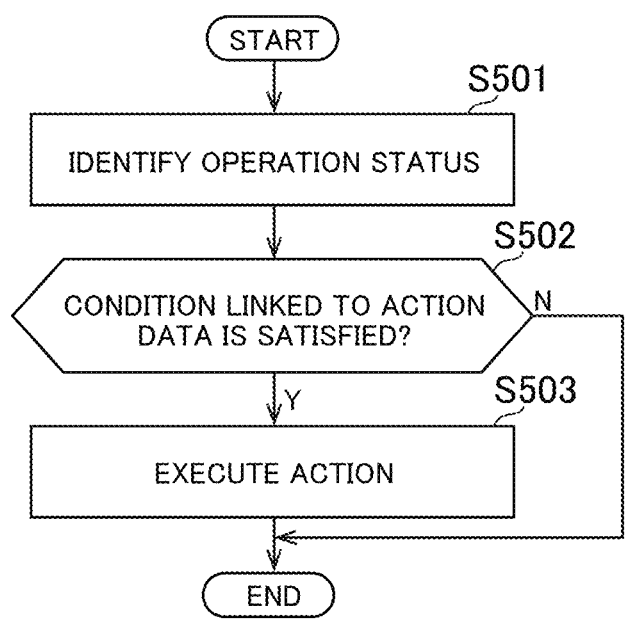
FIG. 22 is a flow chart for illustrating an example of a flow of a process performed by the NOS in the one embodiment of the present invention.

Next, a flow of an execution process of an action executed by the E2EO module 96 of the NOS 32 is described with reference to a flow chart illustrated in FIG. 22. FIG. 22 is an illustration of a process for executing an action indicated by the action data based on one specific piece of action data.

First, the policy manager module 140 identifies the operation status indicated by the condition data linked to the action data (Step S501). In this case, the policy manager module 140 identifies the operation status indicated by the condition data linked to the action data based on data indicating the operation status, for example, data indicating the performance index value or data indicating the notification of the alert, which is held by the policy manager module 140.

As described above, in the process step of Step S501, a combination of the operation status of a specific type of element and the data indicating the operation status of another type of element linked to the specific type of element may be identified. Further, the combination of the operation status of a specific type of software element and the operation status of the hardware on which the specific type of software element is operating may be identified.

Then, the policy manager module 140 determines whether or not the operation status identified in the process step of Step S501 satisfies the condition linked to the action data (Step S502).

When it is determined that the condition is not satisfied ("N" in Step S502), the process illustrated in this process example is ended.

When it is determined that the condition is satisfied ("Y" in Step S502), the E2EO module 96 executes the action indicated by the action data (Step S503), and the process illustrated in this process example is ended.

In the process step of Step S503, for example, the policy manager module 140 may instruct the state machine associated with the specific type of element indicated by the action data to execute the action indicated by the action data. Then, the state machine may execute the action.

The process steps of from Step S501 to Step S503 illustrated in FIG. 22 are executed on, for example, all pieces of action data stored in the policy manager module 140 at a predetermined timing. For example, the process steps of from Step S501 to Step S503 may be executed at a predetermined time interval, or may be executed in response to the reception of the data indicating the operation status, for example, the reception of the data indicating the performance index value or the notification of the alert.

Figure 23:
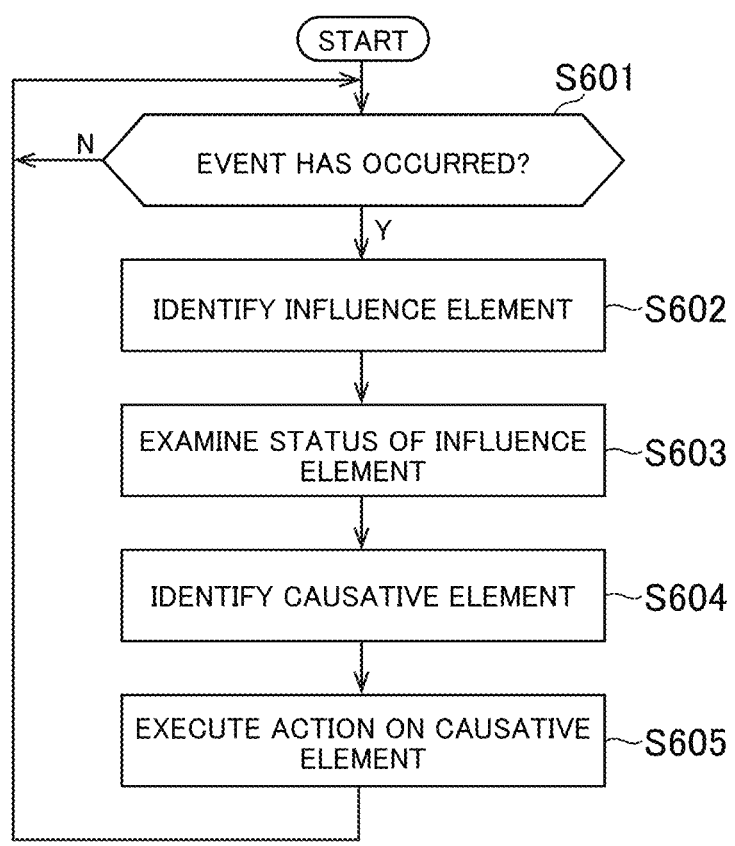
FIG. 23 is a flow chart for illustrating an example of a flow of a process performed by the NOS in the one embodiment of the present invention.

Next, an example of a flow of a process for identifying the cause of an event and a process for executing the action, which are executed by the E2EO module 96 of the NOS 32 in response to the detection of the occurrence of the event relating to the event occurrence element, is described with reference to a flow chart illustrated in FIG. 23.

First, the policy manager module 140 monitors the occurrence of an event for each of the elements included in the communication system 1 (Step S601).

When it is detected that an event has occurred in a certain element (event occurrence element), the policy manager module 140 identifies at least one influence element relating to the event occurrence element based on the inventory data (Step S602).

Then, the policy manager module 140 examines the status of the influence element identified in the process step of Step S602 (Step S603).

Then, the policy manager module 140 identifies the causative element based on the status of the influence element examined in the process step of Step S603 (Step S604).

Then, the E2EO module 96 executes the action corresponding to the event on the causative element identified in the process step of Step S604 (Step S605), the process returns to the process step of Step S601.

In the process step of Step S605, for example, the policy manager module 140 may instruct the state machine associated with the causative element to execute the action corresponding to the event. Then, the state machine may execute the action.

As a part of the examination of the status indicated in Step S603, the packet for confirmation may be transmitted to the influence element.

In another case, the packet for confirmation may be transmitted to the influence element in which the occurrence of a failure has been confirmed between the process step of Step S603 and the process step of Step S604. Then, in the process step of Step S604, of the influence elements in which the occurrence of a failure has been confirmed, the element that has not been reached by the packet for confirmation may be identified as the causative element.

[Supplement]

Note that, the present invention is not limited to the embodiment described above.

For example, in this embodiment, the calculation logic indicated by the calculation logic data may include a calculation expression for accumulating the performance index values of lower-level elements in the topology data and calculating the performance index value of an upper-level element. Further, in this embodiment, the performance index values of the CNFC, the NF, the NS, and the network slice may be calculated in order by tracing back the hierarchical structure indicated by the topology data. Further, the performance index value of the NSSI may be calculated based on the performance index value of the NF or the NS.

Further, the performance index represented by the performance index value in this embodiment may be a throughput or a connection completion rate. Further, the performance index value may include (1) the target value or guaranteed value of the throughput, (2) the target value or guaranteed value of the connection completion rate, and (3) the target value or guaranteed value of the number of simultaneous connections.

Further, the performance index value of the NS may include (1) a radio resource control (RRC) connection completion rate (KPI of RAN domain NS), (2) an attach success rate (KPI of core domain NS), and (3) an EPS radio access bearer (ERAB) established success rate (KPI of core domain NS). Further, as the performance index value (for example, connection completion rate) of an NSI (or NSSI) at a higher-level of the NS, there may be calculated the product of (1) the average value of the RRC connection completion rate, (2) the average value of the attach success rate, and (3) the average value of the ERAB established success rate. Further, the average value of the RRC connection completion rate over a plurality of gNBs belonging to the same NSI (or NSSI) may be used as the average value of the RRC connection completion rate.

The invention claimed is:

1. An action execution system, comprising:
   at least one processor; and
   at least one memory device storing instructions which, when executed by the at least one processor, cause the at least one processor to perform operations comprising:
   storing inventory data indicating a current status of a link between elements included in a communication system;
   storing action data which is linked to a condition relating to a combination of an operation status of a specific type of element and an operation status of another type of element linked to the specific type of element, and which indicates an action to be executed on the specific type of element that satisfies the condition;
   identifying, based on the current status indicated by the inventory data, a combination of a current operation status of the specific type of element included in the communication system and a current operation status of another type of element linked to the specific type of element; and
   executing, when the identified combination satisfies the condition linked to the action data, the action indicated by the action data on the specific type of element.

2. The action execution system according to claim 1,
   wherein the action data is linked to a condition relating to a combination of an operation status of a specific type of network service and an operation status of each of a plurality of functional units under control of the specific type of network service, and which indicates an action to be executed on the specific type of network service that satisfies the condition,
   wherein identifying comprises identifying, based on the current status indicated by the inventory data, a combination of a current operation status of the specific type of network service included in the communication system and a current operation status of each of the plurality of functional units under the control of the specific type of network service, and
   wherein executing comprises executing, when the identified combination satisfies the condition linked to the action data, the action indicated by the action data on the specific type of network service.

3. The action execution system according to claim 1,
   wherein the action data is linked to a condition relating to a combination of an operation status of a specific type of functional unit and an operation status of a network service having the specific type of functional unit under control thereof, and which indicates an action to be executed on the specific type of functional unit that satisfies the condition,
   wherein identifying comprises identifying based on the current status indicated by the inventory data, a combination of a current operation status of the specific type of functional unit included in the communication system and a current operation status of the network service having the specific type of functional unit under the control thereof, and
   wherein executing comprises executing, when the identified combination satisfies the condition linked to the action data, the action indicated by the action data on the specific type of functional unit.

4. The action execution system according to claim 1,
   wherein the action data is linked to a condition relating to a combination of an operation status of a specific type of network slice and an operation status of each of a plurality of functional units belonging to the specific type of network slice, and which indicates an action to be executed on the specific type of network slice that satisfies the condition, wherein identifying comprises identifying, based on the current status indicated by the inventory data, a combination of a current operation status of the specific type of network slice included in the communication system and a current operation status of each of the plurality of functional units belonging to the specific type of network slice, and wherein executing comprises executing, when the identified combination satisfies the condition linked to the action data, the action indicated by the action data on the specific type of network slice.

5. The action execution system according to claim 1, wherein the action data is linked to a condition relating to a combination of an operation status of a specific type of functional unit and an operation status of a network slice to which the specific type of functional unit belongs, and which indicates an action to be executed on the specific type of functional unit that satisfies the condition, wherein identifying comprises identifying, based on the current status indicated by the inventory data, a combination of a current operation status of the specific type of functional unit included in the communication system and a current operation status of the network slice to which the specific type of functional unit belongs, and wherein executing comprises executing, when the identified combination satisfies the condition linked to the action data, the action indicated by the action data on the specific type of functional unit.

6. The action execution system according to claim 1, wherein the condition is a condition relating to a combination of a performance index value of the specific type of element or an event that occurs in the specific type of element and a performance index value of another type of element linked to the specific type of element or an event that occurs in the another type of element.

7. The action execution system according to claim 1, wherein each of the elements is a network service, a functional unit, a CNFC, a pod, a container, a network slice (NSI), or a network slice subnet instance (NSSI).

8. A control method for an action execution system, the action execution system storing:
  inventory data indicating a current status of a link between elements included in a communication system; and
  action data which is linked to a condition relating to a combination of an operation status of a specific type of element and an operation status of another type of element linked to the specific type of element, and which indicates an action to be executed on the specific type of element that satisfies the condition, the control method comprising:
  identifying, based on the current status indicated by the inventory data, a combination of a current operation status of the specific type of element included in the communication system and a current operation status of another type of element linked to the specific type of element; and
  executing, when the identified combination satisfies the condition linked to the action data, the action indicated by the action data on the specific type of element.

* * * * *